United States Patent
Li et al.

(10) Patent No.: US 12,213,053 B2
(45) Date of Patent: Jan. 28, 2025

(54) UE, NETWORK NODES FOR HANDLING UE CATEGORY INFORMATION

(71) Applicant: Telefonaktiebolaget LM Ericsson (publ), Stockholm (SE)

(72) Inventors: Xiaoming Li, Shanghai (CN); Bela Rathonyi, Lund (SE); Emre Yavuz, Stockholm (SE); Nianshan Shi, Järfälla (SE); Qiong Song, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 442 days.

(21) Appl. No.: 17/599,608

(22) PCT Filed: Mar. 17, 2020

(86) PCT No.: PCT/SE2020/050275
§ 371 (c)(1),
(2) Date: Sep. 29, 2021

(87) PCT Pub. No.: WO2020/204781
PCT Pub. Date: Oct. 8, 2020

(65) Prior Publication Data
US 2022/0191766 A1    Jun. 16, 2022

(51) Int. Cl.
*H04W 48/02* (2009.01)
*H04W 4/70* (2018.01)
(Continued)

(52) U.S. Cl.
CPC ............ *H04W 48/02* (2013.01); *H04W 4/70* (2018.02); *H04W 8/22* (2013.01); *H04W 48/16* (2013.01)

(58) Field of Classification Search
CPC .......... H04W 4/50; H04W 4/70; H04W 8/20; H04W 8/22; H04W 36/14; H04W 48/02; H04W 48/04; H04W 48/06; H04W 48/16
(Continued)

(56) References Cited

U.S. PATENT DOCUMENTS 11,363,605 B2 * 6/2022 Awad ..................... H04W 72/21
11,700,597 B2 * 7/2023 Ko .................... H04W 72/0453
370/338
(Continued)

FOREIGN PATENT DOCUMENTS

CN       101909354 A     12/2010
CN       102348214 A      2/2012
(Continued)

OTHER PUBLICATIONS

Author Unknown, "Technical Specification Group Core Network and Terminals; Numbering, addressing and dentification (Release 15)," Technical Specification 23.003, Version 15.6.0, 3GPP Organizational Partners, Dec. 2018, 130 pages.
(Continued)

*Primary Examiner* — Jean A Gelin
(74) *Attorney, Agent, or Firm* — Withrow & Terranova, PLLC

(57) ABSTRACT

The present disclosure relates to a method performed by a first network node. The first network node determines which UE category a UE belongs to. The UE category is M or non-BL in CE. The first network node provides UE category information about the determined UE category to a second network node.

20 Claims, 13 Drawing Sheets

(51) Int. Cl.
*H04W 8/22* (2009.01)
*H04W 48/16* (2009.01)

(58) Field of Classification Search
USPC .......................................................... 370/329
See application file for complete search history.

(56) References Cited

U.S. PATENT DOCUMENTS

| | | | |
|---|---|---|---|
| 2011/0317660 A1* | 12/2011 | Jin | H04W 36/0022 370/331 |
| 2017/0325258 A1* | 11/2017 | Nogami | H04L 1/0068 |
| 2018/0042015 A1* | 2/2018 | Yin | H04W 72/23 |
| 2018/0103426 A1* | 4/2018 | Nacer | H04L 43/08 |
| 2018/0123744 A1* | 5/2018 | Nogami | H04W 52/248 |
| 2018/0160253 A1* | 6/2018 | Ahluwalia | H04B 1/3816 |
| 2018/0206263 A1* | 7/2018 | Lin | H04W 56/003 |
| 2018/0263015 A1 | 9/2018 | Burbidge et al. | |
| 2019/0098564 A1* | 3/2019 | Gupta | H04W 52/26 |
| 2019/0150218 A1 | 5/2019 | Futaki | |
| 2019/0349842 A1* | 11/2019 | Lee | H04W 48/12 |
| 2019/0394719 A1* | 12/2019 | Soliman | H04W 48/18 |
| 2020/0187084 A1* | 6/2020 | Fujishiro | H04W 36/385 |
| 2021/0014759 A1* | 1/2021 | Zhu | H04L 69/24 |
| 2021/0029618 A1* | 1/2021 | Jain | H04W 48/02 |
| 2021/0120476 A1* | 4/2021 | Lee | H04W 48/10 |
| 2021/0306049 A1* | 9/2021 | Kim | H04L 1/1858 |
| 2021/0344527 A1* | 11/2021 | Go | H04W 72/23 |
| 2022/0167140 A1* | 5/2022 | Shrestha | H04W 4/90 |
| 2023/0156575 A1* | 5/2023 | Sheik | H04W 76/15 370/329 |

FOREIGN PATENT DOCUMENTS

| | | |
|---|---|---|
| CN | 104640212 A | 5/2015 |
| CN | 105103622 A | 11/2015 |
| CN | 106416312 A | 2/2017 |
| CN | 106576326 A | 4/2017 |
| CN | 107770847 A | 3/2018 |
| WO | 2017195398 A1 | 11/2017 |

OTHER PUBLICATIONS

Author Unknown, "Technical Specification Group Services and System Aspects; General Packet Radio Service (GPRS) enhancements for Evolved Universal Terrestrial Radio Access Network (E-UTRAN) access (Release 16)," Technical Specification 23.401, Version 16.1.0, 3GPP Organizational Partners, Dec. 2018, 411 pages.

Author Unknown, "Technical Specification Group Services and System Aspects; Non-Access-Stratum (NAS) protocol for Evolved Packet System (EPS); Stage 3 (Release 15)," Technical Specification 24.301, Version 15.6.0, 3GPP Organizational Partners, Mar. 2019, 539 pages.

Author Unknown, "Technical Specification Group Radio Access Network; Radio Resource Control (RRC); Protocol specification (Release 15)," Technical Specification 25.331, Version 15.4.0, 3GPP Organizational Partners, Sep. 2018, 2318 pages.

Author Unknown, "Technical Specification Group Radio Access Network; Evolved Universal Terrestrial Radio Access (E-UTRA); Physical channels and modulation (Release 15)," Technical Specification 36.211, Version 15.4.0, 3GPP Organizational Partners, Dec. 2018, 240 pages.

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Technical Specification 36.300, Version 15.4.0, 3GPP Organizational Partners, Dec. 2018, 363 pages.

Author Unknown, "Technical Specification Group Radio Access Network; Evolved Universal Terrestrial Radio Access (E-UTRA); User Equipment (UE) procedures in idle mode (Release 15)," Technical Specification 36.304, Version 15.2.0, 3GPP Organizational Partners, Dec. 2018, 55 pages.

Author Unknown, "Technical Specification Group Radio Access Network; Evolved Universal Terrestrial Radio Access (E-UTRA); User Equipment (UE) radio access capabilities (Release 15)," Technical Specification 36.306, Version 15.3.0, 3GPP Organizational Partners, Dec. 2018, 114 pages.

Author Unknown, "Technical Specification Group Radio Access Network; Evolved Universal Terrestrial Radio Access Network (E-Utran); S1 Application Protocol (S1AP) (Release 15)," Technical Specification 36.413, Version 15.4.0, 3GPP Organizational Partners, Dec. 2018, 383 pages.

Ericsson, "R4-1811333: Correction of terminology for non-BL CE UE for Rel-13," Third Generation Partnership Project (3GPP), TSG-RN WG4 Meeting #88, Aug. 20-24, 2018, 5 pages, Gothenburg, Sweden.

Qualcomm Incorporated, et al., "S2-185784: Identification of LTE-M (eMTC) traffic," Third Generation Partnership Project (3GPP), TSG-SA2 Meeting #127bis, May 28-Jun. 1, 2018, 73 pages, Newport Beach, USA.

International Search Report and Written Opinion for International Patent Application No. PCT/SE2020/050275, mailed May 26, 2020, 13 pages.

First Office Action for Chinese Patent Application No. 202080039932. 0, mailed Aug. 9, 2023, 15 pages.

Ericsson, "R2-165558: Early Cat M1 indication," 3GPP TSG-RAN WG2 #95, Aug. 22-26, 2016, Gothenburg, Sweden, 2 pages.

Ericsson, "R4-1902700: Introduction of NE-DC in 36.133," 3GPP TSG-RAN WG4 Meeting #90, Feb. 25-Mar. 1, 2019, Athens, Greece, 15 pages.

Examination Report for European Patent Application No. 20713407. 3, mailed Jan. 24, 2022, 4 pages.

Examination Report for European Patent Application No. 20713407. 3, mailed Feb. 16, 2023, 5 pages.

Second Office Action for Chinese Patent Application No. 202080039932. 0, mailed Jan. 11, 2024, 25 pages.

* cited by examiner

UE, NETWORK NODES FOR HANDLING UE CATEGORY INFORMATION

This application is a 35 U.S.C. § 371 national phase filing of International Application No. PCT/SE2020/050275, filed Mar. 17, 2020, which claims the benefit of International Application No. PCT/CN2019/080611, filed Mar. 29, 2019, the disclosures of which are hereby incorporated herein by reference in their entireties.

TECHNICAL FIELD

Embodiments herein relate generally to a User Equipment (UE), a method performed by the UE, a first network node, a method performed by the first network node, a second network node and a method performed by the second network node. More particularly the present disclosure relates to handling UE category information.

BACKGROUND

LTE-M is short for LTE-MTC low power wide area (LPWA). LTE is short for Long Term Evolution and MTC is short for Machine Type Communication. LTE-M is a currently evolving LPWA technology. It may also be described as LTE category (Cat) M1 suitable for Internet of Things (IoT) UEs and/or Machine to Machine type communication (MTC) and/or MTC IoT (MIoT) UEs. LTE-M networks may co-exist with Second Generation (2G), Third Generation (3G), Fourth Generation (4G), Fifth Generation (5G) mobile networks, and also any future generations of the mobile networks. The LTE-M network may benefit from at least some of the security and privacy features of these networks. Evolved MTC (eMTC) is another term used for LTE-M. LTE-M may be described as a simplified version of LTE. For example, an LTE-M UE is less complex, has low power consumption and extended coverage compared to an LTE device. A UE may also be referred to as a device.

LTE-M may support a wide range of applications that need low data rates. It may be used for sensor monitoring in e.g. smart meters, tracking devices etc. It can also support IoT applications that need real-time communications, e.g. voice, emergency data etc., as well as those that need fixed and mobile communications.

Example use cases include wearables, patient monitoring, home security, industrial asset management, retail and POS and transportation.

NarrowBand-IoT (NB-IoT) is another LPWA technology applicable to IoT UEs. NB-IoT may also be referred to as category M2, LTE category NB1, or LTE-M1.

UE category information may be used to enable a base station to communicate effectively with all the UEs connected to it. The UE category defines e.g. the UE's a combined uplink and downlink capability. The term class may be used instead of category.

In LTE, a LTE UE category indicates which speed, uplink and/or downlink, which the radio unit can handle. The LTE category may also indicate the number of antennas, i.e. Multiple Input Multiple Output (MIMO) layer. LTE category M1 has 1 Mbit/s for downlink, 1 Mbit/s for uplink and 1 MIMO layer. LTE category M2 has 4 Mbit/s for downlink, 6 Mbit/s for uplink and 1 MIMO layer.

The Service and System Aspects Working Group 2 (SA2) of the Third Generation Partnership Project (3GPP) introduced a new Radio Access Technology (RAT) type for LTE-M in order to apply a separate charging model to traffic from an LTE-M UE and to introduce requirements for identification and transparency when roaming.

To fulfil those requirements, the Mobility Management Entity (MME) needs to indicate whether the UE is category M1/M2 to the Serving-Gateway/Packet Data Unit-Gateway (S-GW/P-GVV) as a new RAT type in a Create Session Request message. The MME also needs to block inbound roaming for category M1/M2 UEs in the initial attach if it is required by the operator. Category M1/M2 indicates that the UE is either of category M1 or of category M1. Sometimes, the term category M is used when referring to either of category M1 or category M2, where M indicates MTC.

Route the Cat-M UEs to the specific Dedicated Core Network (DCN) based on its Initial Attach Request message or Tracking Area Update (TAU) Request message may also be required.

During the initial attach procedure, the UE does random access and the first message from the evolved Node B (eNB) to the Core Network (CN) is an INITIAL UE MESSAGE. At this stage, the eNB does not have UE capability information. The MME requests the eNB to enquire the UE capability in the Initial Context Setup Request. The MME stores the UE capability information until the UE is detached.

But with the current solution in 3GPP, which uses category M1/M2 to assign the new RAT type LTE-M in the core network, the MME can only get an explicit LTE-M indication in the UE CAPABILITY INFO INDICATION, as show in FIG. 1 and FIG. 2.

FIG. 1 shows that the eNB 103 provides the MME 105 with an UE capability information indication message in step 1). The UE capability information indication message comprises the UE capability information, possibly in addition to other information. The UE capability information indicates the UE's radio capabilities. The UE capability information may comprise the UE Radio Capability information and the UE Core Network Capability information. The UE Radio Capability information may comprise information on RATs that the UE supports, e.g. power class, frequency bands, etc. The UE Core Network capability may be split into the UE Network Capability Information Element (IE) and the Mobile Station (MS) Network Capability IE, and comprises non radio-related capabilities, e.g. the Non Access Stratum (NAS) security algorithms etc.

The eNB 103 determines whether a UE is of category M from the UE's radio capability and if the UE signals one or more of the specific category M. The eNB 103 then indicates to the MME 105 whether the UE is category M in the UE Radio Capability for category M Differentiation-information in a S1-Application Protocol (S1-AP) message(s) used to upload the UE Radio Capabilities to the MME 105.

FIG. 2 comprises at least one of the following steps, which steps may be performed in any suitable order than described below:

Step 201

The MME 105 may provide a request message to the eNB 103. The request message may be a S1-AP message which may be an INITIAL CONTEXT SETUP REQUEST. The message may comprise UE Security Capabilities and UE Radio Capability. The UE radio capability may be in the form of UERadioAccessCapabilitylnformation.

Step 202

The eNB 103 may provide a response message to the MME 105. The response message may be a response to the request message in step 201. The response message may be an S1-AP message. The response message may be an INITIAL CONTEXT SETUP RESPONSE.

Step 203

The eNB 103 decides if more capabilities are needed, e.g. based on
which other RATs the UE 101 supports, and/or
if such neighbor cells are present.

Step 204

The eNB 103 may provide a Radio Resource Control (RRC) message to the UE 101. The RRC message may be a UECapabilityEnquiry message. The RRC message may indicate a RAT-Type.

Step 205

The UE 101 may provide a RRC response message to the eNB 103. The RRC response message may comprise UECapabilityInformation. The UECapabilityInformation may be for example RAT-Type and/or UE-CapabilityRAT Container.

Step 206

The eNB 103 keeps the capabilities during RRC CONNECTED state and builds a UERadioAccessCapabilityInformation message comprising at least substantially all known capabilities excluding the Universal Mobile Telecommunications System (UMTS) Terrestrial Radio Access Network (UTRAN) capability.

Step 207

The eNB 103 provides a S1-AP message to the MME 105. The S1-AP message may be a UE CAPABILITY INFO INDICATION message. The message may comprise the UE Radio Capability: UERadioAccessCapabilityInformation.

Step 208

The MME 105 keeps capabilities until DETACH or ATTACH.

If the MME 105 gets the LTE-M indication IE in UE CAPABILITY INFO INDICATION message, the MME 105 shall report LTE-M RAT type to the S-GW and the P-GW as seen in FIG. 3. FIG. 3 comprises at least one of the following steps, which steps may be performed in any suitable order than described below:

Step 301

The UE 101 may send an RRC connection setup complete message to the eNB 103. The message may comprise or may be an Attach Request.

Step 302

The eNB 103 may send an initial UE message to the MME 105.

Step 303

Authentication and security procedures are executed in the network.

Step 304

The MME 105 may send an Update Location Request message to the HSS 106.

Step 305

The HSS 106 may send an Update Location Answer message to the MME 105.

Step 306

The MME 105 may send a Create Session Request message to the GW 108. The GW 108 may be a SGW or a PGW etc. The Create Session Request message may comprise a LTE-M RAT type indication.

Step 307

The GW 108 may send a Create Session Response message to the MME 105.

Step 308

The MME 105 may send an Initial context Setup Request message to the eNB 103. The message may comprise an attach accept indication.

Step 309

The eNB 103 may send a UE capability enquiry message to the UE 101.

Step 310

The UE 101 may send a UE capability information indication message to the eNB 103. The message may comprise an LTE-M indication.

Step 311

The eNB 103 may send a RRC connection reconfiguration message to the UE 101.

Step 312

The UE 101 may send a RRC connection reconfiguration complete message to the eNB 103.

Step 313

The eNB 103 may send an initial context setup response message to the MME 105.

In the Attach procedure as shown in FIG. 3, when MME 105 receives the Initial UE message, it will send the Create Session Request to the SGW and indicate to SGW 108 that this is for an LTE-M1/M2 UE for charging. However, the UE capability, if not available at the MME 105, can be received from eNB 103 after Initial Context Setup Request/Response (ICSR), which would be late.

For block roaming a category M1/M2 UE, this would mean that the UE 101 will always be accepted for the attach procedure and when the MME 105 receives the UE capability after ICSR, the UE 101 may be detached. This means the roaming category M UE can access the network for communication during initial attach even though it should be blocked. It would also mean extra signaling if to allow it to access and late to detach it, so that to block the services.

For Dedicated CN (DCN) selection, category M1/M2 UEs may be routed to a wrong DCN in the attach. The UE Usage Type (UUT) setting now is per International Mobile Subscriber Identity (IMSI) level, however, if a Mobile Broadband (MBB) Universal Subscriber Identity Module (USIM) is inserted into a category M1/M2 UE. After the MME 105 in the wrong DCN receives the UE capabilities, a re-route may be needed to steer the UE 101 to the correct DCN. It requires additional network signaling and the reroute may not happen immediately.

In the current technology, the indication for category LTE-M1/M2 UEs is received by the CN in the UE Capability Information after the UE context and the user plane has been setup. This is too late.

Therefore, there is a need to at least mitigate or solve this issue.

SUMMARY

An objective of embodiments herein is therefore to obviate at least one of the above disadvantages and to provide improved handling of information, e.g. UE category information. Using other words, to provide improved identification of a UE of a certain category, e.g. a first or second category.

According to a first aspect, the object is achieved by a method performed by a first network node. The first network node determines which UE category a UE belongs to. The UE category is M or non-Bandwidth reduced Low complexity (BL) in Coverage Enhancement (CE). The first network node provides UE category information about the determined UE category to a second network node.

According to a second aspect, the object is achieved by a first network node. The first network node is adapted to determine which UE category a UE belongs to. The UE category is M or non-BL in CE. The first network node is adapted to provide UE category information about the determined UE category to a second network node.

According to a third aspect, the object is achieved by a method performed by a second network node. The second network node obtains, from the first network node, UE category information about which UE category a UE belongs to. The UE category is M or non-BL in CE. The second network node provides the UE category information to a third network node.

According to a fourth aspect, the object is achieved by a second network node. The second network node is adapted to obtain, from the first network node, UE category information about which UE category a UE belongs to. The UE category is M or non-BL in CE. The second network node is adapted to provide the UE category information to a third network node.

According to a fifth aspect, the object is achieved by a method performed by a UE. The UE provides an indication of the UE category to a first network node. The UE category is M or non-BL in CE.

According to a sixth aspect, the object is achieved by a UE. The UE is adapted to provide an indication of the UE category to a first network node. The UE category is M or non-BL in CE.

Embodiments herein afford many advantages, of which a non-exhaustive list of examples follows:
Reduce signaling.
Providing information to the second network node, e.g. the MME, in time.
Improve decision basis in the second network node, e.g. the MME.
Reduces network signaling.
Reducing or avoiding the need for a re-route.
Steers the UE to the correct DCN.
Timing of providing UE capability information to the necessary nodes is improved.

Another advantage of the embodiments herein is that they correctly transfer the LTE-M RAT type to the SGW and PGW already at context creation phase for charging.

Another advantage of the embodiments herein is that they could block a roaming category M UE when received in the Initial UE message. Another advantage is that the DCN selection is optimized based on UUT and UE category M capability.

A further advantage of the embodiments herein is that charging and roaming policy according to the operator's wish for the normal UEs using CE can be applied.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail by way of example only in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 4A:
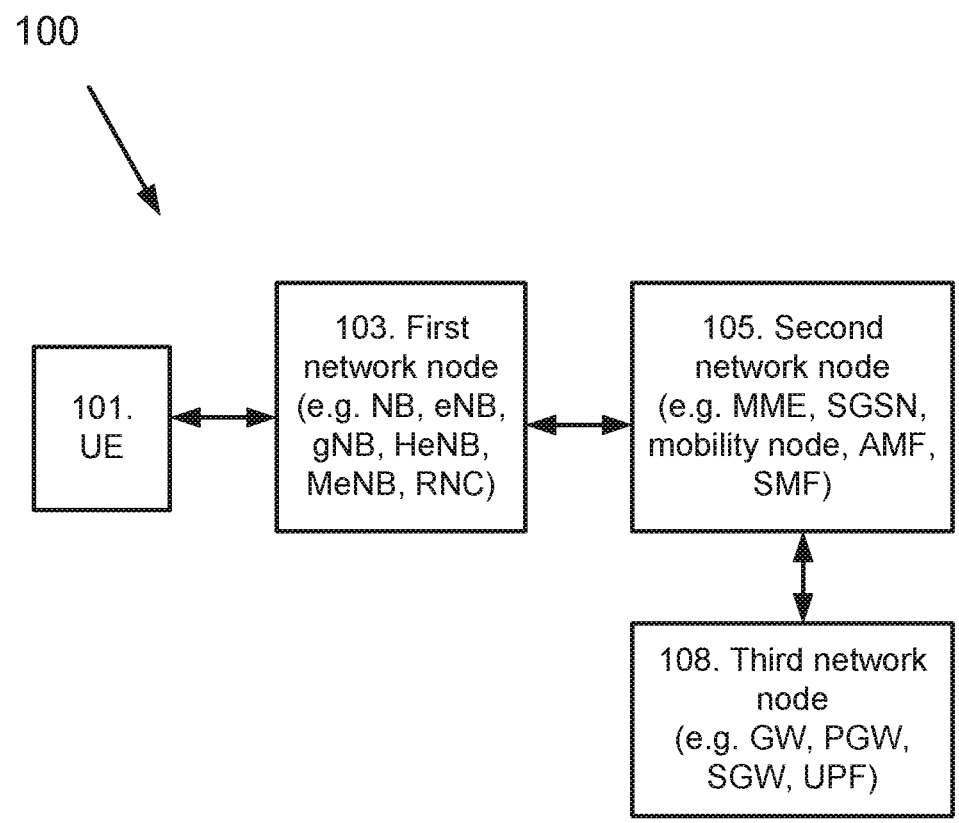
FIG. 4a is a schematic drawing illustrating a communications system.

FIG. 4a depicts non-limiting examples of a communications system 100, which may be a wireless communications network, sometimes also referred to as a wireless communications system, cellular radio system, or cellular network, in which embodiments herein may be implemented. The communications system 100 may typically be a 5G system, 5G network, New Radio-Unlicensed (NR-U) or Next Gen System or network, License Assisted Access (LAA), MulteFire, a 4G system, a 3G system, a 2G system, a LTE-M system a further generation system or any other suitable system. The communications system 100 may alternatively be a younger system than a 5G system The communications system 100 may support other technologies such as, for example, Long-Term Evolution (LTE), LTE-M LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band, NB-IoT. Thus, although terminology from 5G/NR and LTE may be used in this disclosure to exemplify embodiments herein, this should not be seen as limiting the scope of the embodiments herein to only the aforementioned systems. The embodiments herein apply to any previous, current or future system.

The communications system 100 comprises a plurality of network nodes, whereof a first network node 103, a second network node 105 and a third network node 108, also referred to herein as a network node 103, 105, 108 are depicted in the non-limiting example of FIG. 4a. Any of the first network node 103, the second network node 105 and the third network node 108 may be a radio network node, such as a base station, or any other network node with similar features capable of serving a UE 101, such as a wireless device or a machine type communication device, in the communications system 100. The base station may be a gNB, eNB, Nb, MeNB etc. Any of the first network node 103, the second network node 105 and the third network node 108 may be a core network node such as a MME, Serving General Packet Radio Services (GPRS) Support Node, SGSN, PGW, SGW, User Plane Function (UPF), Access and Mobility Management Function (AMF) etc. In some examples, any of the first network node 103, and the second network node 105 may be co-localized, or be part of the same network node. For example, the first network node 103 may be a base station such as e.g. a NB, eNB, gNB, Master eNB (MeNB), Home eNodeB (HeNB), Radio Network Controller (RNC) etc. The second network node 105 may be for example a first core network node such as e.g. a mobility node, a MME, a SGSN, an AMF, a Session Management Function (SMF) etc. The third network node 108 may be for example a second core network node such as a Gateway (GVV), PGW, SGW, UPF etc.

The communications system 100 covers a geographical area which may be divided into cell areas, wherein each cell area may be served by a network node, although, one network node may serve one or several cells. In the example in FIG. 4a, the communications system 100 may comprises a first cell (not shown). In FIG. 4a, the first network node 103 may serve the first cell. Any of the first network node 103, the second network node 105 and the third network node 108 when being base stations may be of different classes, such as, e.g. macro base station, home base station or pico base station, based on transmission power and thereby also cell size. Any of the first network node 103, the second network node 105 and the third network node 108 may be directly connected to one or more core networks. In some examples, any of the first network node 103, the second network node 105 and the third network node 108 may be a distributed node, such as a virtual node in the cloud, and it may perform its functions entirely on the cloud, or partially, in collaboration with a radio network node.

A plurality UEs may be located in the communication system 100, whereof a UE 101, which may also be referred to simply as a device, is depicted in the non-limiting example of FIG. 4a. The UE 101, e.g. a LTE UE or a 5G/NR UE, an IoT UE, a MTC UE, a BL-CE UE, a normal UE, a CE UE, a BL UE, a non-BL UE in CE, it may be a wireless communication device which may also be known as e.g., a wireless device, a mobile terminal, wireless terminal and/or mobile station, a mobile telephone, cellular telephone, or laptop with wireless capability, just to mention some further examples. The UE 101 may be a device by which a subscriber may access services offered by an operator's network and services outside operator's network to which the operator's radio access network and core network provide access, e.g. access to the Internet. The UE 101 may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device, IoT device, terminal device, communication device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another UE, a server, a laptop, a Personal Digital Assistant (PDA), or a tablet, M2M device, device equipped with a wireless interface, such as a printer or a file storage device, modem, or any other radio network unit capable of communicating over a radio link in a communications system 100.

The first network node 103 may be configured to communicate in the communications system 100 with the UE 101 over a first communication link, e.g., a radio link. The second network node 105 may be configured to communicate in the communications system 100 with the first network node 103 over a second communication link, e.g., a radio link. The third network node 108 may be configured to communicate in the communications system 100 with the second network node 105 over a third communication link, e.g., a radio link or a wired link, although communication over more links may be possible.

The UE 101 is enabled to communicate wirelessly within the communications system 100. The communication may be performed e.g. between two devices, between a devices and a regular telephone, between the UE 101 and a network node, between network nodes, and/or between the devices and a server via the radio access network and possibly one or more core networks and possibly the internet.

It should be noted that the communication links in the communications network may be of any suitable kind including either a wired or wireless link. The link may use any suitable protocol depending on type and level of layer (e.g. as indicated by the OSI model) as understood by the person skilled in the art.

Figure 4B:
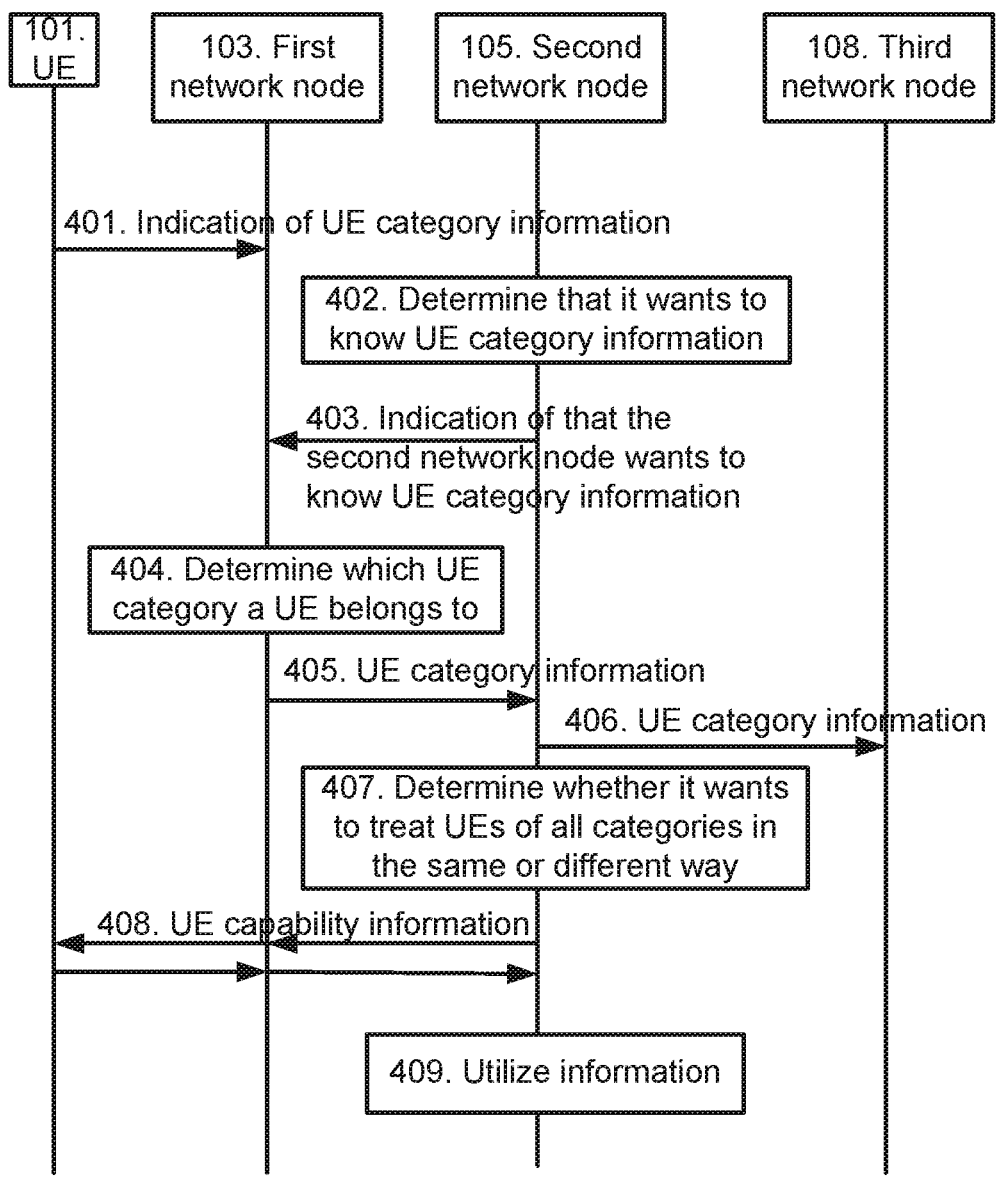
FIG. 4b is a signaling diagram illustrating a method.

FIG. 4b is a signalling diagram illustrating a method. The first network node seen in FIG. 4b may be an access node, for example an eNB, gNB, NB, base station, RNC. The UE 101 may be an IoT UE, an IoT device, a MTC device, a MTC UE. The second network node 105 may be a mobility node, a MME, a SGSN, a combined MME and SGSN node, a AMF, a SMF etc.

The method comprises at least one of the following steps, which steps may be performed in any suitable order than described below:

Step 401

Figure 5:
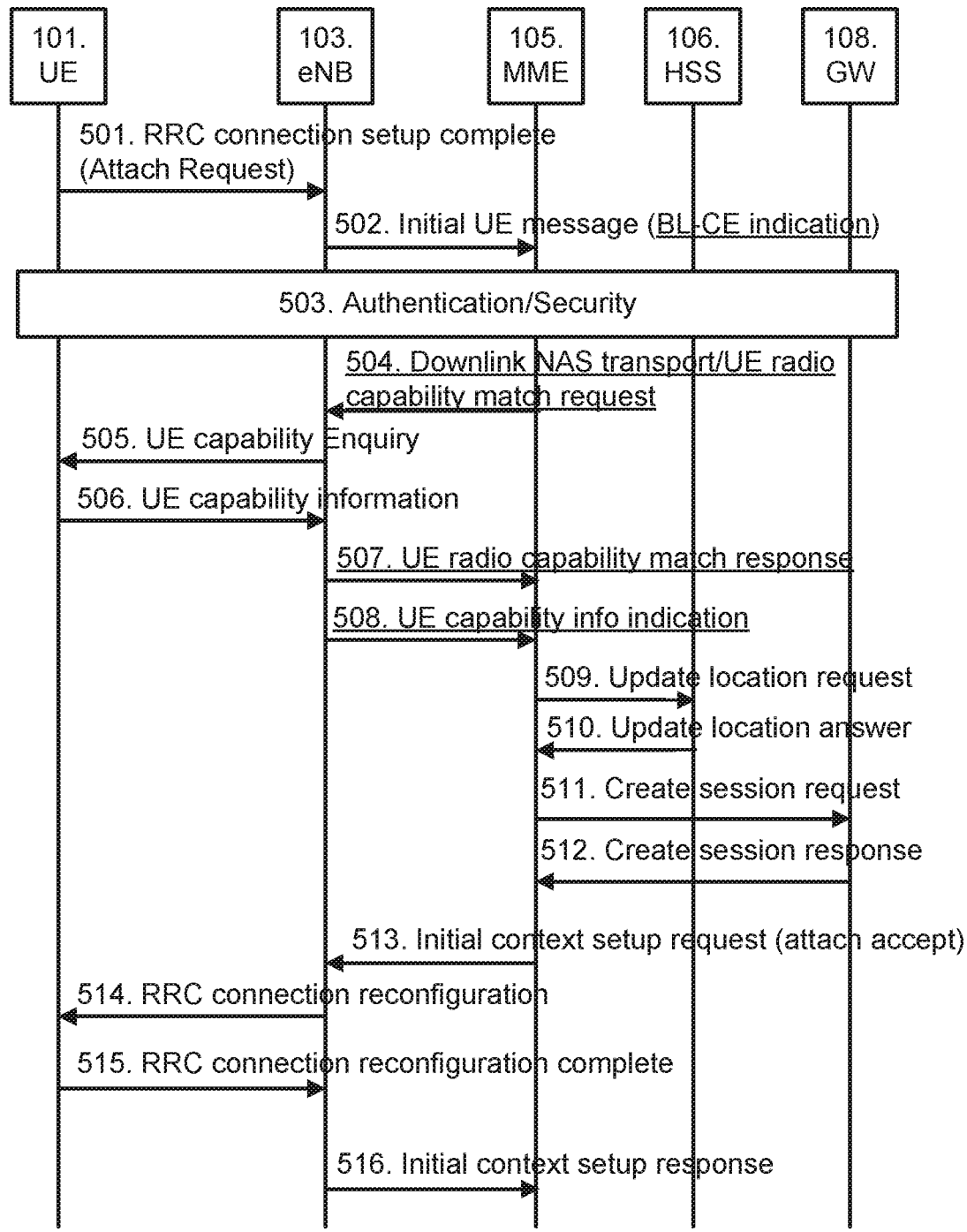
FIG. 5 is a signaling diagram illustrating a method.

This step may correspond to step 506 in FIG. 5. The UE 101 may send an indication of the UE category to the first network node 103. The first network node 103 may receive the indication of the UE category from the UE 101. This step may be described as the UE 101 providing the indication of the UE category to the first network node 103, and the first network node 103 obtains the indication of the UE category from the UE 101.

The indication indicates the capability of the UE 101, e.g. which category the UE 101 belongs to. The UE category information may be UE radio category information. The UE category information may be referred to as UE capability information, or the UE category information may be comprised in the UE capability information.

The indication may be sent by the UE 101 to the first network node 103 in a RRC message, e.g. an RRCConnectionSetupCompletemessage.

Before step 401, the UE 101 may have determined what kind of radio resources it will use and broadcasted information about this, e.g. via SIB2. Instead of the UE 101 sending the indication to the first network node 103, the first network node 103 may detect the UE category from information, e.g. a preamble, received in a random access procedure, e.g. the broadcasted information. So, with the broadcasted information, the first network node 103 may be aware, e.g. by detecting a preamble during a random access procedure, that the UE 101 is of category M1, category M2 or a non-BL UE in CE.

Step 402

The second network node 105 determines that it wants to know the UE category information.

Step 403

This step corresponds to step 504 in FIG. 5. The second network node 105 may send, to the first network node 103, an indication of that it wants to know the UE category information. The first network node 103 may receive the indication from the second network node 105.

The second network node 105 may send, e.g. during a S1 setup procedure, an indication of that it wants to know the UE category information.

Step 404

The first network node 103 determines which UE category the UE 101 belongs to. The UE category may be category M or non-BL in CE. Category M may be category M1 or category M1.

When the UE 101 belongs to the category M, then the UE 101 may be described as being a category M UE or a BL UE.

When the UE 101 is not of category M, then the UE 101 may be described as a non-BL UE in CE, or a UE belonging to a category different from category M, i.e. different from category M1 and category M1. A category which is different from category M may be for example category 1, category 2, category 3, category n, where n is a positive integer. The second category may be referred to as a normal category, or any other category except M1 and M1. The first and second categories are different from each other.

Step 404 may be performed before steps 402-403, after steps 402-403, between steps 402 and 403, or at the same time as steps 402-403 are performed.

The determining of the UE category may comprise detecting the UE category in a random access procedure.

The UE category may be determined based on the indication from step 401, e.g. in a RRC message such as e.g. a RRC connection setup complete message. The UE category may be determined based on information from the random access procedure, e.g. by detection of the preamble during the random access procedure.

When a UE 101 of category M has previously been deployed in the communications system 100, the indication from step 401 indicates a non-BL UE in CE, and when the information from the random access procedure, e.g. the preamble, does not comprise any indication for a non-BL UE in CE, then the first network node 103 may determine that the UE 101 belongs to category M.

Step 405

This step corresponds to step 502 and step 508 in FIG. 5. The first network node 103 sends the UE category information to the second network node 105. The second network node 105 receives the UE category information from the first network node 103. This step may be described as the first network node 103 provides UE category information about the determined UE category to the second network node 105. The UE category is category M1/M2 or non-BL in CE. The UE category information may be referred to as UE capability information, or the UE category information may be comprised in the UE capability information.

The first network node 103 may send the UE category information to the second network node 105 before the second network node 105 creates the session towards the serving GW, or choose the DCN.

The UE category information may be sent to the second network nod 105 in e.g. an initial UE message. The UE category information may be sent to the second network node 105 before the second network node 105 creates the session towards the GW.

Step 406

The second network node 103 may send the UE category information to the third network node 108. The third network node 108 may receive the UE category information from the second network node 105. This step may be described as the second network node 105 provides the UE category information to the third network node 108. The third network node 108 may be e.g. a GW.

Step 407

The second network node 105 may determine whether it wants to treat UEs 101 of all UE categories in the same way or in different ways related to at least one of charging and roaming.

When the second network node 105 has determined that it should treat UEs 101 of a certain category in a different way than UEs 101 of other categories, then the second network node 105 may requests the first network node 103 for UE capability information from the UE 101.

Step 407 may be performed after step 406 or after step 406. Step 407 may be performed after step 402 and before step 403.

Step 408

The second network node 105 may obtain UE capability information from the UE 101 via the first network node 103.

For example, the second network node 105 may, based on local policy, send the Downlink NAS Transport with explicit UE Radio Capability Request indication to the first network node 103. Then the first network node 103 may fetch the UE radio capability from the UE 101.

If the second network node 105 wants to have special handling only for the UEs of category M, it may request the first network node 103 to obtain the UE Radio Capability. E.g. it sends the UE Radio Capability Match Request to the first network node 103 to fetch the UE radio capability from the UE 101.

Step 409

The second network node 105 may utilize the UE category information. The second network node 105 may utilize the UE category information based on a result of the decision in step 407. The second network node 105 may utilize the UE category information to apply DCN charging or a roaming policy.

FIG. 5 is a signalling diagram illustrating an example method to indicate the BL-CE UEs to the MME 105, after the eNB 103 has detect such UE 101 in a Random Access Channel (RACH) procedure. FIG. 5 illustrates the same method as FIG. 4b, but providing more details than FIG. 4b. In FIG. 5, the first network node 103 is exemplified by an eNB 103, the second network node 105 is exemplified by a MME 105 and the third network node 108 is exemplified by a GW 108. However, the first, second and third network nodes 103, 105, 108 may be any other suitable node, e.g. the ones described above with reference to FIG. 4a. The method comprises at least one of the following steps, which steps may be performed in any suitable order than described below:

Step 501

Figure 3:
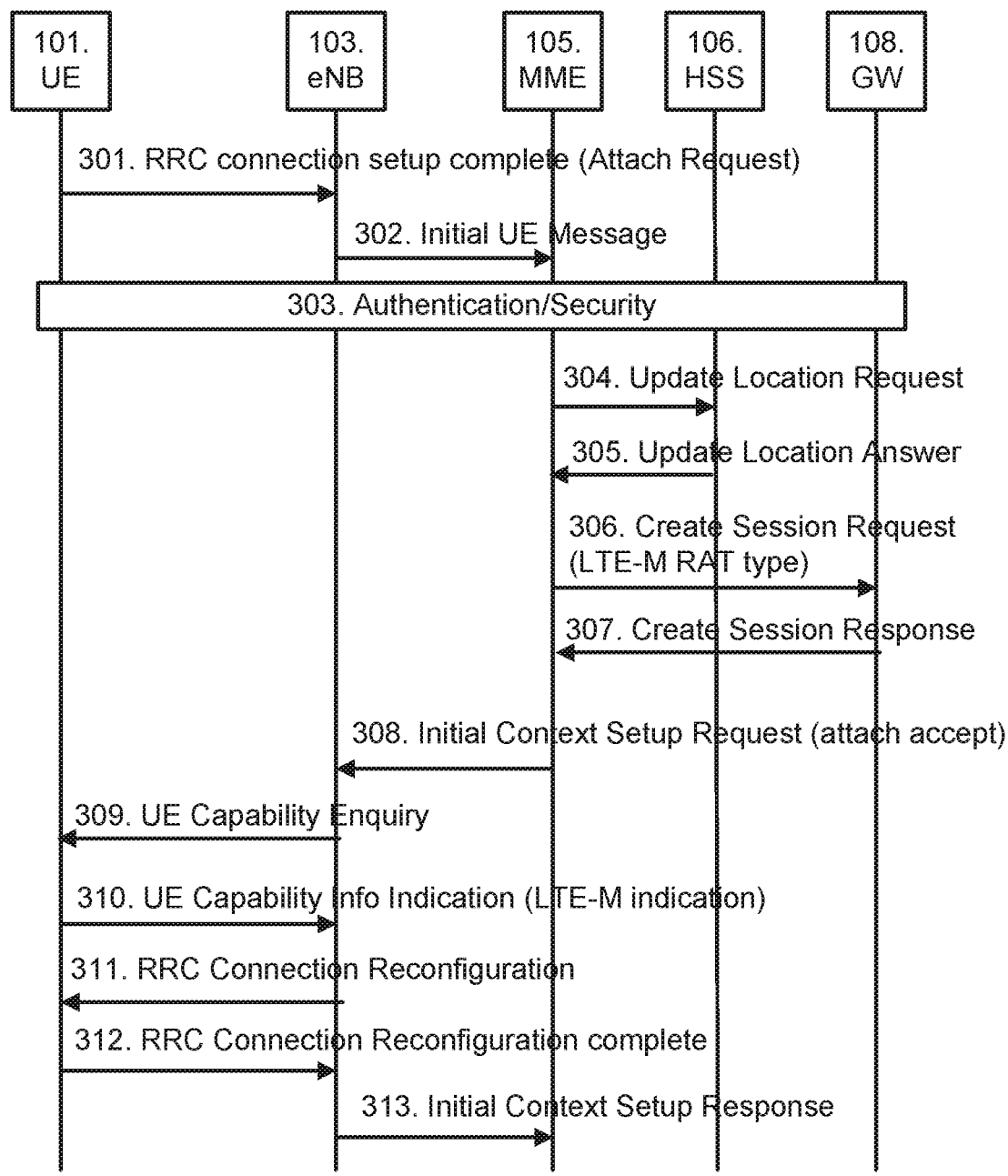
FIG. 3 is a signalling diagram illustrating a method.

This step corresponds to step 301 in FIG. 3. The UE 101 may send an RRC connection setup complete message to the eNB 103. The message may comprise or may be an Attach Request.

Step 502

The eNB 103 may send an initial UE message to the MME 105. The message comprises a BL-CE indication, i.e. an indication that the UE 101 is a BL-CE UE. See Table 1 which provides an example of the Initial UE message.

Step 503

This step corresponds to step 303 in FIG. 3. Authentication and security procedures are executed in the communications system 100.

Step 504

The MME 105 may send a Downlink NAS transport/UE radio capability match request to the eNB 103. The UE radio capability match request may be referred to as UE category match request.

Step 505

This step corresponds to step 309 in FIG. 3. The eNB 103 may send a UE capability enquiry message to the UE 101. The UE capability enquiry message may be referred to as a UE category enquiry message.

Step 506

The UE 101 may send UE capability information to the eNB 103. This step may be described as the UE 101 may send UE category information to the eNB 103, and the UE category information may be comprised in the UE capability information.

Step 507

The eNB 103 may send a UE radio capability match response to the MME 105. The UE radio capability match response may be referred to as UE category match response Step 508

The eNB 103 may send a UE capability information indication to the MME 105. The UE capability information indication may be referred to as UE category information indication or UE category indication.

Step 509

This step corresponds to steps 304 in FIG. 3. The MME 105 may send an Update Location Request message to the HSS 106.

Step 510

This step corresponds to step 305 in FIG. 3. The HSS 106 may send an Update Location Answer message to the MME 105.

Step 511

The MME 105 may send a Create Session Request message to the GW 108.

Step 512

The GW 108 may send a Create Session response to the MME 105.

Step 513

This step corresponds to step 308 in FIG. 3. The MME 105 may send an Initial Context Setup Request message to the eNB 103. The message may comprise an attach accept indication.

Step 514

This step corresponds to step 311 in FIG. 3. The eNB 103 may send a RRC connection reconfiguration message to the UE 101.

Step 515

This step corresponds to step 312 in FIG. 3. The UE 101 may send a RRC connection reconfiguration complete message to the eNB 103.

Step 516

This step corresponds to step 313 in FIG. 3. The eNB 103 may send an initial context setup response message to the MME 105.

Before a UE 101 sends Msg1, e.g. RACH Preamble, it has to determine what kind of RACH resource it should use. This information is broadcast via System Information block 2 (SIB2).

If the UE 101 is a BL UE or a UE in EC, then the eNB 103 would become aware of this during random access procedure. So at least by detecting the preamble, the eNB 103 would know that the UE 101 is a BLUE, i.e. category M1 or category M2, or a UE 101 in CE, i.e. a normal category UE that supports CE.

The below embodiments 1 and 2 may be seen as UE based solutions:

Embodiment 1

Step 1a:
  This step 1a corresponds to step 401 of FIG. 4b.
  An indication may be introduced in a RRC messages, e.g. the RRCConnectionSetupComplete message, to inform the eNB 103 whether the UE 101 is a category M1/M2 UE, i.e. category M, or a normal category UE using CE, i.e. a non-BL UE in CE.

Step 2a:
  This step 2a corresponds to steps 404 and 405 of FIG. 4b.
  The eNB 103 then can include the LTE-M Indication in the Initial UE Message.

Embodiment 2

Considering that category M1/M2 UEs have already been deployed, as they are in the early RRC releases. But this is not the case for normal category UEs that support CE, as they come in at later release. So another solution may be as follows:

Step 1b:
  This step 1b corresponds to step 401 of FIG. 4b.
  Have an indication mandatory in the RRC message, e.g. RRCConnectionSetupComplete message, to indicate that the UE 101 is a normal category UE using CE, i.e. a non-BL UE in CE.

Step 2b:
  This step 2b corresponds to step 401 and step 404 in FIG. 4b.
  The eNB 103 detects the preambles the UE 101 used. If there is no explicit-indication for non-BL UE in CE, as it is mandatory for such UE 101, then the eNB 103 could conclude that the UE 101 is of category M1/M1. This makes the solution early implementable relatively easily.

Step 3b:
  This step 3b corresponds to step 405 in FIG. 4b.
  The eNB 103 then can include the LTE-M Indication in Initial UE Message, i.e. the indication of category M.

This indication in step 1b of embodiment 2 may be provided in a legacy message, i.e. RRCConnectionSetupComplete, which has been used since early releases in 3GPP. The field parameter is a new addition. A field parameter is added for a UE 101 to indicate whether it is category M1/M2 from Release-13 (Rel-13) on otherwise one would not be able to steer those UEs 101 to the right DCN during initial attach procedure. This field parameter would be optional when coded in Abstract syntax notation.1 (ASN.1) since there is no need for a legacy, i.e. normal category UE, to signal such. An alternative is to introduce a field parameter that indicates whether the UE 101 is a non-BL UE in CE. For the same reason as above, it should be implemented from Rel-13 on, but the field parameter will again be optional with a condition such as that the field is mandatory present if the UE is a non-BL UE in CE, or something similar.

The embodiments 3, 4 and 5 may be seen as network-based solution as in FIGS. 4 and 5:

Embodiment 3

Step 1c:
  This step 1c corresponds to step 401 in FIG. 4b.
  The eNB 103 detects that category M1/M2 UE or a non-BL UEs in CE in a Random access procedure.
Step 2c: Based on local policy, the eNB 103 triggers the UECapabilityEnquiry procedure to obtain the UE radio capability from the UE 101.
Step 3c:
  This step 3c corresponds to step 405 in FIG. 4b.
  The eNB 103 includes a category M indication, e.g. a LTE-M indication in Initial UE message.
Alternatively, the MME 105 could indicate to the eNB 103 during S1 Setup procedure that it is interested in knowing if the UE 101 is a LTE-M device (see step 402 and step 403 in FIG. 4), or if the UE 101 is a LTE-M and the normal UE using CE, so the eNB 103 could act accordingly.

Embodiment 4

Step 1d:
  This step 1d corresponds to step 401 in FIG. 4b.
  The eNB 103 detects the BL and/or CE UEs or normal UEs using CE in the random access, i.e. it detects category M or non-BL UE in CE;
Step 2d:
  This step 2d corresponds to step 405 in FIG. 4b.
  The eNB 103 indicates to the MME 105, e.g. in an INITIAL UE MESSAGE that the UE 101 is BL-CE, meaning the UE 101 is either BL and/or CE or normal UE using CE, refer to FIG. 3.
Step 3d:
  This step 3d corresponds to step 407 in FIG. 4b.
  The MME 105, based on local policy, decides if it wants to treat all the BL and/or CE UEs, or normal UEs using CE the same, when it is related to charging, roaming.
Step 4d:
  This step 4d corresponds to step 408 in FIG. 4b.
  If the MME 105 wants to have special handling only for the LTE-M UEs, it will request the eNB 103 to obtain the UE Radio Capability. E.g. it sends the UE Radio Capability Match Request to the eNB 103 to fetch the UE radio capability from the UE 101. After the MME 103 received the UE CAPABILITY INFO INDICATION, include the LTE-M indication to proceed with the following procedure, such as create session towards the SGW, setup the initial context and user plane towards the RAN.

Embodiments 5
  Step 1e and Step 3e are the same as in embodiment 3, i.e. the same as step 1d and step 3d.
  Step 4e:
    This step 4e corresponds to step 408 in FIG. 4b.
    The MME 105, based on local policy, sends the Downlink NAS Transport with explicit UE Radio Capability Request indication to the eNB 103. Then the eNB 103 fetches the UE radio capability from the UE 101, after the MME 105 received the UE CAPABILITY INFO INDICATION, include the LTE-M indication to proceed with the following procedure.

For the network-based solution, the assumption is that for the most UEs 101, there is no need to get the UE category during the UE attach procedure.

It is only when the eNB 103 detects that the special preambles are used, i.e. that the UE 101 is a BL/CE, or a normal UE using CE, that the UE Radio Capability may need to be obtained so the MME 105 could use the information to apply DCN, charging or roaming policy.

Note that the steps in the solutions do not need to be applied in order in some cases, e.g. in embodiment 2.

Note that the eNB 103 could exclude the NB-IoT UEs by the information in message (msg) 5, the RRC connection setup. If it cannot, the same embodiments above would apply.

Note that the embodiments apply to NR, when category M1, category M2, or normal category UE using CE or in CE will be supported.

The communications system 100 may be a 5G system, a 4G system, a 3G system or a 2G system or any future system.

Initial UE Message
  This message is sent by the first network node 103 to transfer the initial layer 3 message to the second network node 105 over the S1 interface, e.g. as seen in step 502 in FIG. 5. An example of the initial UE message is found in Table 1 below. The initial UE message is transmitted in the direction from the first network node 103 to the second network node 105.

TABLE 1

Initial UE message

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| eNB UE S1AP ID | M | | 9.2.3.4 | | YES | reject |
| NAS-PDU | M | | 9.2.3.5 | | YES | reject |
| TAI | M | | 9.2.3.16 | Indicating the Tracking Area from which the UE has sent the NAS message. | YES | reject |
| E-UTRAN CGI | M | | 9.2.1.38 | Indicating the E-UTRAN CGI from which the UE has sent the NAS message. | YES | ignore |
| RRC Establishment Cause | M | | 9.2.1.3a | | YES | ignore |

TABLE 1-continued

| Initial UE message | | | | | |
|---|---|---|---|---|---|
| IE/Group Name | Presence Range | IE type and reference | Semantics description | Criticality | Assigned Criticality |
| S-TMSI | O | 9.2.3.6 | | YES | reject |
| CSG Id | O | 9.2.1.62 | | YES | reject |
| GUMMEI | O | 9.2.3.9 | | YES | reject |
| Cell Access Mode | O | 9.2.1.74 | | YES | reject |
| GW Transport Layer Address | O | Transport Layer Address 9.2.2.1 | Indicating GW Transport Layer Address if the GW is collocated with eNB. | YES | ignore |
| Relay Node Indicator | O | 9.2.1.79 | Indicating a relay node. | YES | reject |
| GUMMEI Type | O | ENUMERATED (native, mapped, . . . ) | | YES | ignore |
| Tunnel Information for BBF | O | Tunnel Information 9.2.2.3 | Indicating HeNB's Local IP Address assigned by the broadband access provider, UDP port Number. | YES | ignore |
| SIPTO L-GW Transport Layer Address | O | Transport Layer Address 9.2.2.1 | Indicating SIPTO L-GW Transport Layer Address if the SIPTO L-GW is collocated with eNB. | YES | ignore |
| LHN ID | O | 9.2.1.92 | | YES | ignore |
| MME Group ID | O | 9.2.3.44 | | YES | ignore |
| UE Usage Type | O | INTEGER (0 . . . 255) | | YES | ignore |
| CE-mode-B Support Indicator | O | 9.2.1.118 | | YES | ignore |
| DCN ID | O | INTEGER (0 . . . 65535) | | YES | ignore |
| Coverage Level | O | ENUMERATED (extended coverage, . . . ) | | YES | ignore |
| UE Application Layer Measurement Capability | O | BIT STRING (SIZE(8)) | Each bit in the bitmap indicates an UE Application layer measurement capability, refer to TS 25.331[10]. Bit 0 = QoE Measurement for streaming service Bit 1 = QoE Measurement for MTSI service Value '1' indicates "Capable" and value '0' indicates "not Capable". Unused bits are reserved for future use. | YES | ignore |
| EDT Session | O | ENUMERATED (true, . . . ) | | YES | |

TABLE 1-continued

Initial UE message

| IE/Group Name | Presence | Range | IE type and reference | Semantics description | Criticality | Assigned Criticality |
|---|---|---|---|---|---|---|
| BL-CE Indication | O | | x.y.z | This IE indicates if the UE is BL and or CE, or normal UE using CE. | YES | ignore |

BL-CE Indication

This IE is provided by the first network node 103 to inform that the UE is either a category M UE or a non-BL UE in CE, e.g. a BL and/or CE, or a normal UE using CE. The BL-CE indication may also be referred to as a UE category information or a UE category indication. The UE category information may be comprised in UE capability information. The BL-CE indication may be as seen in Table 2 below.

TABLE 2

BL-CE Indication

| IE/Group Name | Presence | Range | IE type and reference | Semantics description |
|---|---|---|---|---|
| BL-CE Indication | M | | ENUMERATED (BL-CE, . . . ) | The value BL-CE indicates that the UE is BL and/or CE, or normal UE using CE. |

A computer program may comprise instructions which, when executed on at least one processor, cause the at least one processor to carry out the method according to any one of embodiments herein. A carrier may comprise the computer program, wherein the carrier is one of an electronic signal, optical signal, radio signal or computer readable storage medium.

Figure 6A:
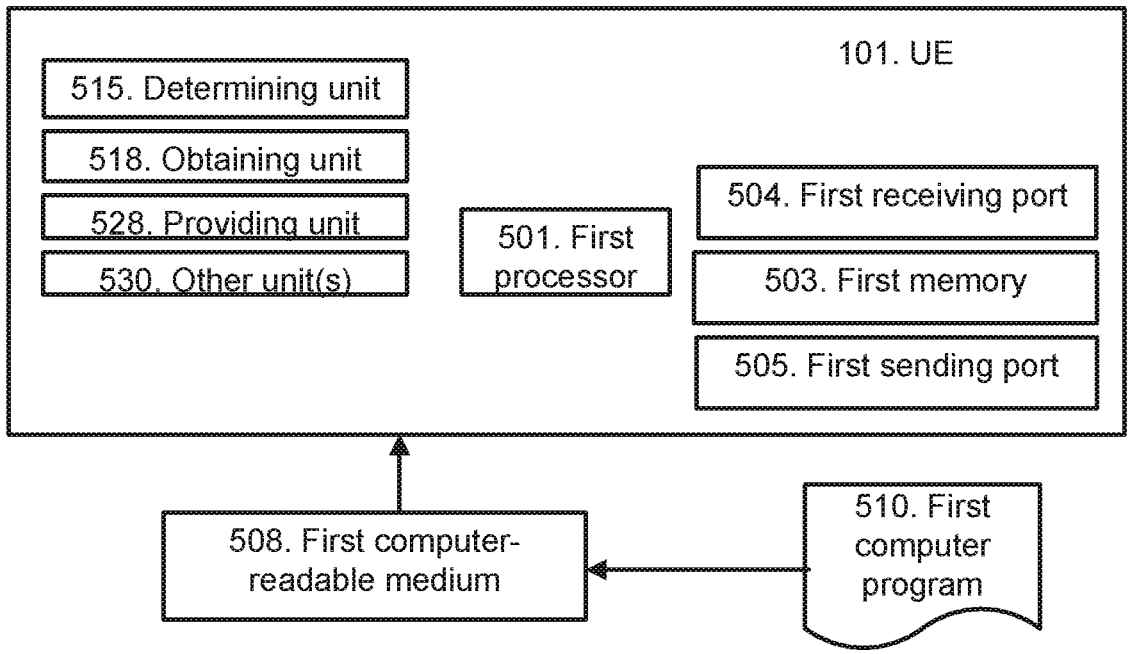
FIG. 6a is a schematic drawing illustrating an example of a UE.
Figure 6B:
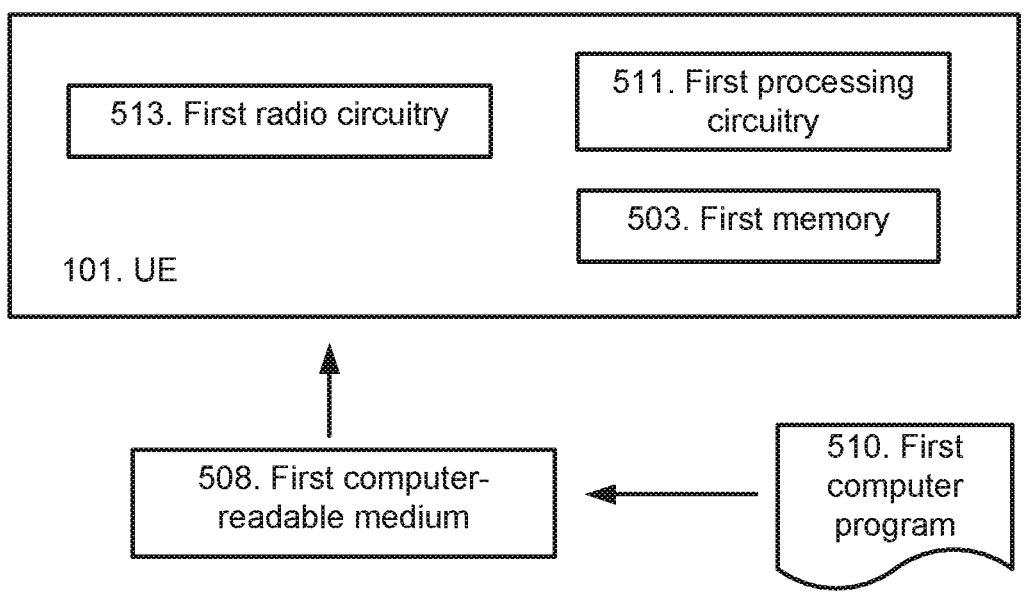
FIG. 6b is a schematic drawing illustrating an example of a UE.

FIG. 6a and FIG. 6b depict two different examples in panels a) and b), respectively, of the arrangement that the UE 101 may comprise. In some embodiments, the UE 101 may comprise the following arrangement depicted in FIG. 6a.

The embodiments herein in the UE 101 may be implemented through one or more processors, such as a first processor 501 in the UE 101 depicted in FIG. 6a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the UE 101. One such carrier may be in the form of a CD ROM disc. It is however feasible with other data carriers such as a memory stick. The computer program code may furthermore be provided as pure program code on a server and downloaded to the UE 101.

The UE 101 may further comprise a first memory 503 comprising one or more memory units. The first memory 503 is arranged to be used to store obtained information, store data, configurations, schedulings, and applications etc. to perform the methods herein when being executed in the UE 101.

In some embodiments, the UE 101 may receive information from, e.g. the first network node 103 and/or the second network node 105, through a first receiving port 504. In some embodiments, the first receiving port 504 may be, for example, connected to one or more antennas in UE 101. In other embodiments, the UE 101 may receive information from another structure in the communications system 100 through the first receiving port 504. Since the first receiving port 504 may be in communication with the first processor 501, the first receiving port 504 may then send the received information to the first processor 501. The first receiving port 504 may also be configured to receive other information.

The first processor 501 in the UE 101 may be further configured to transmit or send information to e.g. first network node 103 and/or the second network node 105 and/or the third network node 108, or another structure in the communications system 100, through a first sending port 505, which may be in communication with the first processor 510, and the first memory 503.

The UE 101 may comprise a determining unit 515, an obtaining unit 518, a providing unit 528, other unit(s) 530 etc.

The UE 101 may be adapted to, e.g. by means of the providing unit 528, provide an indication of UE category to the first network node 103. The indication indicates which category the UE belongs to. The UE 101 may be adapted to, e.g. by means of the obtaining unit 518, obtain a request for the indication from the first network node.

Those skilled in the art will also appreciate that the determining unit 515, obtaining unit 518, a providing unit 528 and other unit(s) 530 described above may refer to a combination of analog and digital circuits, and/or one or more processors configured with software and/or firmware, e.g., stored in memory, that, when executed by the one or more processors such as the first processor 501, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 515-530 described above may be implemented as one or more applications running on one or more processors such as the first processor 501.

Thus, the methods according to the embodiments described herein for the UE 101 may be respectively implemented by means of a first computer program 510 product, comprising instructions, i.e., software code portions, which, when executed on at least one first processor 501, cause the at least one first processor 501 to carry out the actions described herein, as performed by the UE 101. The first computer program 510 product may be stored on a first computer-readable storage medium 508. The first computer-readable storage medium 508, having stored thereon the first computer program 510, may comprise instructions which, when executed on at least one first processor 501, cause the at least one first processor 501 to carry out the actions described herein, as performed by the UE 101. In some embodiments, the first computer-readable storage medium 508 may be a non-transitory computer-readable storage medium, such as a CD ROM disc, or a memory stick. In other embodiments, the first computer program 510 product may be stored on a carrier containing the first computer program 510 just described, wherein the carrier is one of an electronic signal, optical signal, radio signal, or the first computer-readable storage medium 508, as described above.

The UE 101 may comprise a communication interface configured to facilitate communications between the UE 101 and other nodes or devices, e.g., the first network node 103 and/or the second network node 105 and/or the third network node 108, or another structure. The interface may, for example, include a transceiver configured to transmit and receive radio signals over an air interface in accordance with a suitable standard.

In other embodiments, the UE 101 may comprise the following arrangement depicted in FIG. 6b. The UE 101 may comprise a first processing circuitry 511, e.g., one or more processors such as the first processor 510, in the UE 101 and the first memory 503. The UE 101 may also comprise a first radio circuitry 513, which may comprise e.g., the first receiving port 504 and the first sending port 505. The first processing circuitry 511 may be configured to, or operable to, perform the method actions according to FIG. 1-FIG. 5, in a similar manner as that described in relation to FIG. 6a. The first radio circuitry 513 may be configured to set up and maintain at least a wireless connection with the UE 101. Circuitry may be understood herein as a hardware component.

Hence, embodiments herein also relate to the UE 101 operative to operate in the communications system 100. The UE 101 may comprise the first processing circuitry 511 and the first memory 503. The first memory 503 comprises instructions executable by said first processing circuitry 511. The UE 101 is further operative to perform the actions described herein in relation to the UE 101, e.g., in FIG. 5.

Figure 7A:
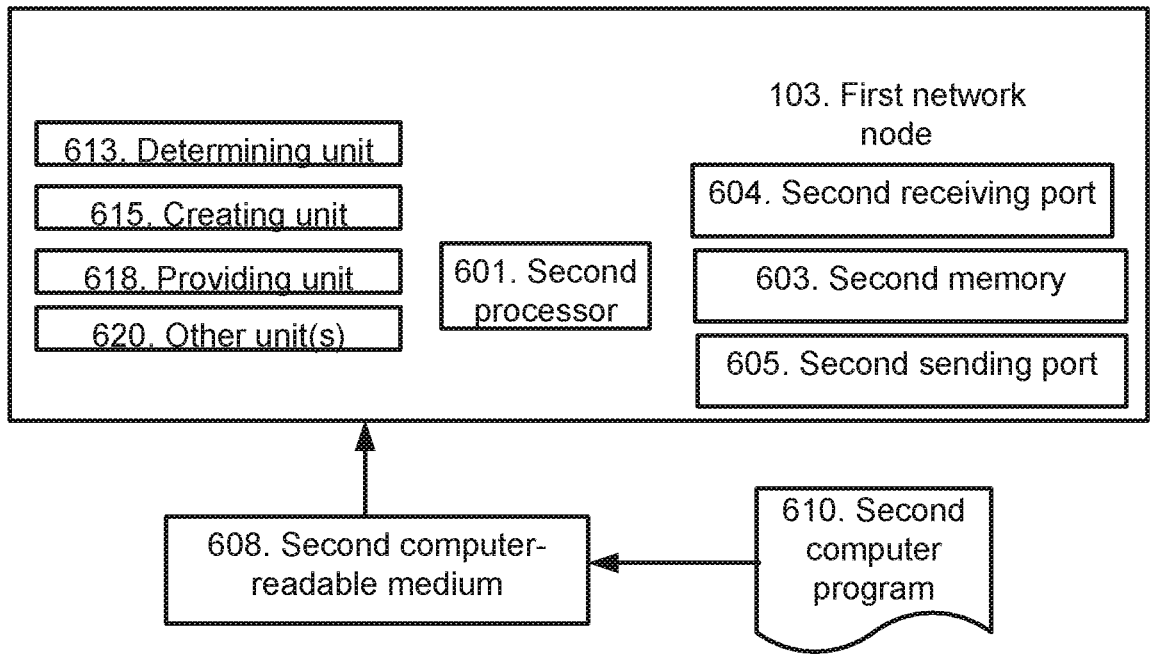
FIG. 7a is a schematic drawing illustrating an example of a first network node.
Figure 7B:
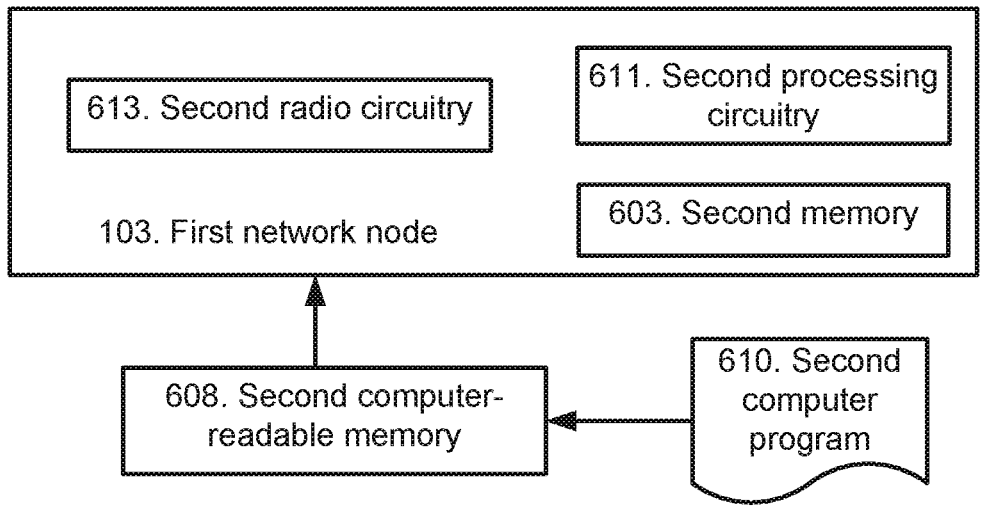
FIG. 7b is a schematic drawing illustrating an example of a first network node.

FIG. 7a and FIG. 7b depict two different examples in panels a) and b), respectively, of the arrangement that the first network node 103 may comprise. In some embodiments, the first network node 105 may comprise the following arrangement depicted in FIG. 7a.

The embodiments herein in the first network node 103 may be implemented through one or more processors, such as a second processor 601 in the first network node 103 depicted in FIG. 7a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first7 network node 103. One such carrier may be in the form of a CD ROM disc. It is however feasible with other data carriers such as a memory stick. The computer program code may furthermore be provided as pure program code on a server and downloaded to the first network node 103.

The first network node 103 may further comprise a second memory 603 comprising one or more memory units. The second memory 603 is arranged to be used to store obtained information, store data, configurations, schedulings, and applications etc. to perform the methods herein when being executed in the first network node 103.

In some embodiments, the first network node 103 may receive information from, e.g., the UE 101 and/or the second network node 105 and/or the third network node 108, through a second receiving port 604. In some embodiments, the second receiving port 604 may be, for example, connected to one or more antennas in first network node 103. In other embodiments, the first network node 103 may receive information from another structure in the communications system 100 through the second receiving port 604. Since the second receiving port 604 may be in communication with the second processor 601, the second receiving port 604 may then send the received information to the second processor 601. The second receiving port 604 may also be configured to receive other information.

The second processor 601 in the first network node 103 may be further configured to transmit or send information to e.g., the UE 101 and/or the second network node 105, or another structure in the communications system 100, through a second sending port 605, which may be in communication with the second processor 601, and the second memory 603.

The first network node 103 may comprise a determining unit 613, a creating unit 615, a providing unit 618, other unit(s) 620 etc. The first network node 103 is adapted to, e.g. by means of the determining unit 613, determine which UE category a UE 101 belongs to. The UE category is at least one of a first category and a second. The first category may be M1 or M1. The second category may be non-BL in CE.

The first network node 103 is adapted to, e.g. by means of the providing unit 618, provide UE category information about the determined UE category to a second network node 105.

The first network node 130 may be adapted to, e.g. by means of the determining unit 613, determine the UE category by detecting the UE category in a random access procedure.

The first network node 103 may be adapted to, e.g. by means of the determining unit 613, determine the UE category based on an indication received from the UE 101.

The indication received from the UE 101 may indicate a second category, e.g. a non-BL UE in CE, and then the first network node 103 may detect that no explicit non-BL in CE category indication is comprised in a RACH preamble. Then the first network node 103 may be adapted to, e.g. by means of the determining unit 613, determine that the UE 101 belongs to the category M, e.g. M1 or M1.

The first network node 103 may be adapted to, e.g. by means of the second receiving port 604, receive, from the second network node 105, an indication of that the second network node 105 wants to know the UE category information.

When the first network node 103 detects that a special preamble is used, then may be is adapted to, e.g. by means of the determining unit 613, determine that UE category information needs to be obtained. The UE category information may be comprised in UE capability information or it may be UE capability information.

The first network node 103 may be an access node, e.g. an eNB, gNB, NB, base station, RNC. The UE 101 may be an IoT UE, an IoT device, a MTC device, a MTC UE. The second network node 105 may be a mobility node, a MME, a SGSN, a combined MME and SGSN node, an AMF, a SMF etc.

Those skilled in the art will also appreciate that the determining unit 613, the creating unit 615, the providing unit 618, other unit(s) 620 etc. described above may refer to a combination of analog and digital circuits, and/or one or more processors configured with software and/or firmware, e.g., stored in memory, that, when executed by the one or more processors such as the second processor 601, perform as described above. One or more of these processors, as well as the other digital hardware, may be included in a single ASIC, or several processors and various digital hardware may be distributed among several separate components, whether individually packaged or assembled into a SoC.

Also, in some embodiments, the different units 613-620 described above may be implemented as one or more applications running on one or more processors such as the second processor 601.

Thus, the methods according to the embodiments described herein for the first network node 103 may be respectively implemented by means of a second computer program 610 product, comprising instructions, i.e., software code portions, which, when executed on at least one second processor 601, cause the at least one second processor 601 to carry out the actions described herein, as performed by the first network node 103. The second computer program 610 product may be stored on a second computer-readable storage medium 608. The computer-readable storage medium 608, having stored thereon the second computer program 610, may comprise instructions which, when executed on at least one second processor 601, cause the at least one second processor 601 to carry out the actions described herein, as performed by the network node 105. In some embodiments, the computer-readable storage medium 610 may be a non-transitory computer-readable storage medium, such as a CD ROM disc, or a memory stick. In other embodiments, the second computer program 610 product may be stored on a carrier containing the second computer program 610 just described, wherein the carrier is one of an electronic signal, optical signal, radio signal, or the second computer-readable storage medium 608, as described above.

The first network node 103 may comprise a communication interface configured to facilitate communications between the first network node 103 and other nodes or devices, e.g., the UE 101 and/or the second network node 105 and/or the third network node 108, or another structure. The interface may, for example, include a transceiver configured to transmit and receive radio signals over an air interface in accordance with a suitable standard.

In other embodiments, the first network node 103 may comprise the following arrangement depicted in FIG. 7b. The first network node 103 may comprise a second processing circuitry 611, e.g., one or more processors such as the second processor 601, in the first network node 103 and the second memory 603. The first network node 103 may also comprise a second radio circuitry 613, which may comprise e.g., the second receiving port 604 and the second sending port 605. The second processing circuitry 611 may be configured to, or operable to, perform the method actions according to FIG. 5 in a similar manner as that described in relation to FIG. 7a. The second radio circuitry 613 may be configured to set up and maintain at least a wireless connection with the first network node 103. Circuitry may be understood herein as a hardware component.

Hence, embodiments herein also relate to the first network node 103 operative to operate in the communications system 100. The first network node 103 may comprise the second processing circuitry 613 and the second memory 603. The second memory 603 contains instructions executable by said second processing circuitry 613. The first network node 103 is further operative to perform the actions described herein in relation to the first network node 103, e.g., in FIG. 5.

Figure 8A:
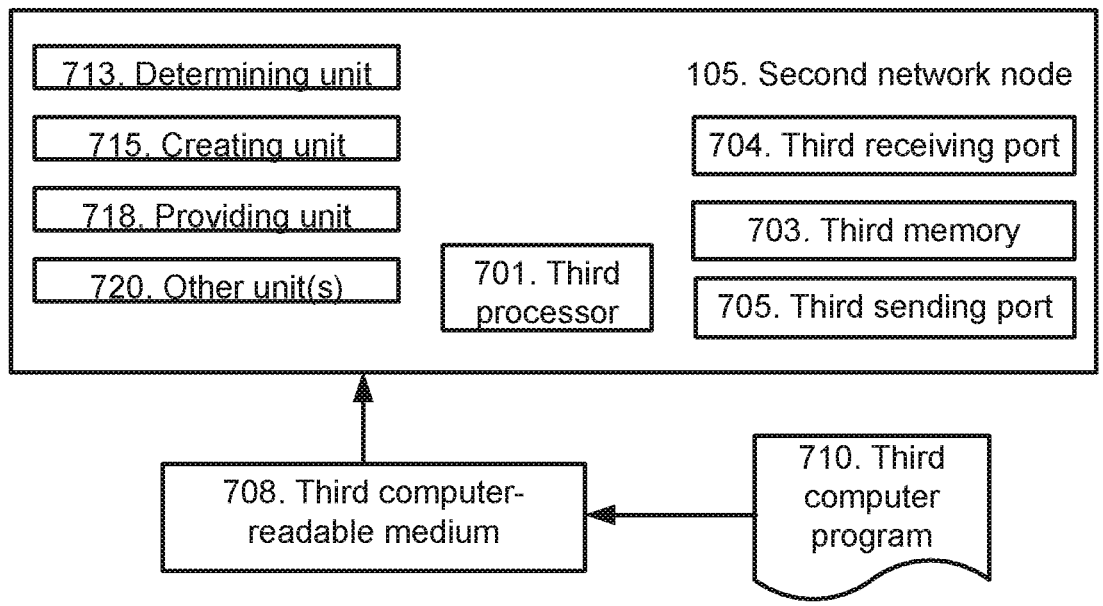
FIG. 8a is a schematic drawing illustrating an example of a second network node.
Figure 8B:
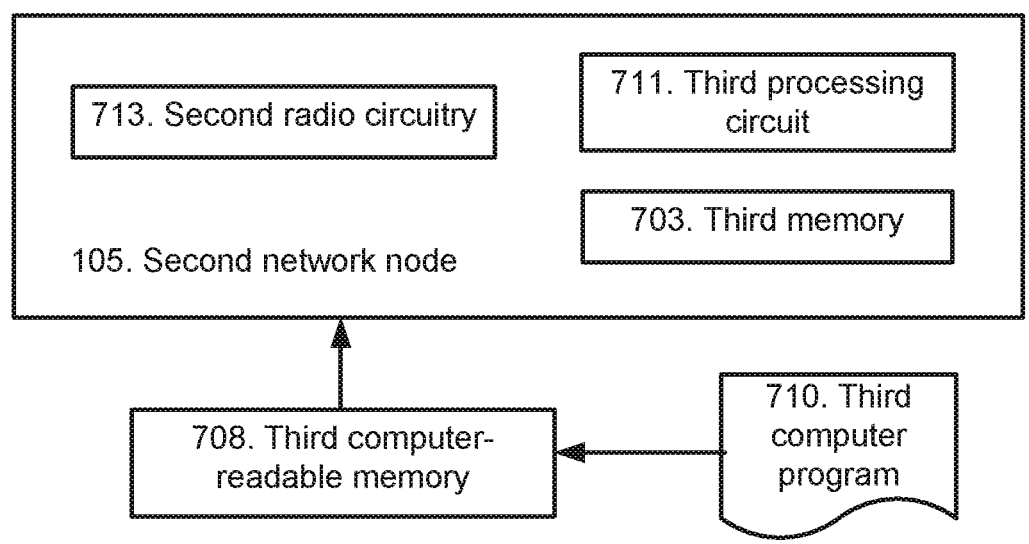
FIG. 8b is a schematic drawing illustrating an example of a second network node.

FIG. 8a and FIG. 8b depict two different examples in panels a) and b), respectively, of the arrangement that the second network node 105 may comprise. In some embodiments, the second network node 105 may comprise the following arrangement depicted in FIG. 8a.

The embodiments herein in the second network node 105 may be implemented through one or more processors, such as a third processor 701 in the second network node 105 depicted in FIG. 8a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the second network node 105. One such carrier may be in the form of a CD ROM disc. It is however feasible with other data carriers such as a memory stick. The computer program code may furthermore be provided as pure program code on a server and downloaded to the second network node 105.

The second network node 105 may further comprise a third memory 703 comprising one or more memory units. The third memory 703 is arranged to be used to store obtained information, store data, configurations, schedulings, and applications etc. to perform the methods herein when being executed in the second network node 105.

In some embodiments, the second network node 105 may receive information from, e.g., the UE 101 and/or the first network node 103 and/or the third network node 108, through a third receiving port 704. In some embodiments, the third receiving port 704 may be, for example, connected to one or more antennas in second network node 105. In other embodiments, the second network node 105 may receive information from another structure in the communications system 100 through the second receiving port 604. Since the third receiving port 704 may be in communication with the third processor 601, the third receiving port 704 may then send the received information to the third processor 701. The third receiving port 704 may also be configured to receive other information.

The third processor 701 in the second network node 105 may be further configured to transmit or send information to e.g., the UE 101 and/or the first network node 103, and/or the third network node 108 or another structure in the communications system 100, through a third sending port 705, which may be in communication with the third processor 701, and the third memory 703.

The second network node 105 may comprise a determining unit 713, a creating unit 715, a providing unit 718, other units(s) 720 etc.

The second network node 105 may be adapted to, e.g. by means of the third receiving port 704, obtain, from the first network node 105, UE category information about which UE category a UE 101 belongs to. The UE category is category M or non-BL in CE.

The second network node 105 may be adapted to, e.g. by means of the providing unit 718, provide the UE category information to a third network node 108.

The second network node 105 may be adapted to, e.g. by means of the determining unit 713, determine that the second network node 105 wants to know the UE category information.

The second network node 105 may be adapted to, e.g. by means of the third sending port 705, transmit, to the first network node 103, an indication of that the second network node 105 wants to know the UE category information.

The second network node 105 may be adapted to, e.g. by means of the determining unit 713, determine whether it wants to treat UEs 101 of all categories in the same or different way related to at least one of charging and roaming.

When the second network node 105 has determined that it should treat UEs 101 of a certain category in a different way than UEs 10) of other categories, then the second network node 105 may be adapted to, e.g. by means of the third sending port 705, request the first network node 103 for UE category information.

The second network node 105 may be adapted to, e.g. by means of the third processor 701, utilize the UE category information to apply DCN charging or roaming policy.

The first network node 103 may be an eNB, gNB, NB, base station, RNC. The UE may be an IoT UE, an IoT device, a MTC device, a MTC UE. The second network node 105 may be a mobility node, a MME, a SGSN, a combined MME and SGSN node, an AMF, a SMF etc.

Those skilled in the art will also appreciate that the determining unit 713, the creating unit 715, the providing unit 718, other unit(s) 720 etc. described above may refer to a combination of analog and digital circuits, and/or one or more processors configured with software and/or firmware, e.g., stored in memory, that, when executed by the one or more processors such as the third processor 701, perform as described above. One or more of these processors, as well as the other digital hardware, may be included in a single ASIC, or several processors and various digital hardware may be distributed among several separate components, whether individually packaged or assembled into a SoC.

Also, in some embodiments, the different units 713-720 described above may be implemented as one or more applications running on one or more processors such as the third processor 701.

Thus, the methods according to the embodiments described herein for the second network node 105 may be respectively implemented by means of a third computer program 710 product, comprising instructions, i.e., software code portions, which, when executed on at least one third processor 701, cause the at least one third processor 701 to carry out the actions described herein, as performed by the second network node 105. The third computer program 710 product may be stored on a third computer-readable storage medium 708. The computer-readable storage medium 608, having stored thereon the third computer program 710, may comprise instructions which, when executed on at least one third processor 701, cause the at least one third processor 701 to carry out the actions described herein, as performed by the second network node 105. In some embodiments, the third computer-readable storage medium 710 may be a non-transitory computer-readable storage medium, such as a CD ROM disc, or a memory stick. In other embodiments, the third computer program 710 product may be stored on a carrier containing the third computer program 710 just described, wherein the carrier is one of an electronic signal, optical signal, radio signal, or the third computer-readable storage medium 708, as described above.

The second network node 105 may comprise a communication interface configured to facilitate communications between the second network node 105 and other nodes or devices, e.g., the UE 101 and/or the first network node 103 and/or the third network node 108, or another structure. The interface may, for example, include a transceiver configured to transmit and receive radio signals over an air interface in accordance with a suitable standard.

In other embodiments, the second network node 105 may comprise the following arrangement depicted in FIG. 8b. The second network node 105 may comprise a third processing circuitry 711, e.g., one or more processors such as the third processor 701, in the second network node 105 and the third memory 703. The second network node 105 may also comprise a third radio circuitry 713, which may comprise e.g., the third receiving port 704 and the third sending port 705. The third processing circuitry 711 may be configured to, or operable to, perform the method actions according to FIG. 5 in a similar manner as that described in relation to FIG. 8a. The third radio circuitry 713 may be configured to set up and maintain at least a wireless connection with the second network node 105. Circuitry may be understood herein as a hardware component.

Hence, embodiments herein also relate to the second network node 105 operative to operate in the communications system 100. The second network node 105 may comprise the third processing circuitry 713 and the third memory 703. The third memory 703 contains instructions executable by said third processing circuitry 713. The second network node 105 is further operative to perform the actions described herein in relation to the second network node 105, e.g., in FIG. 5.

Further Extensions and Variations

Telecommunication network connected via an intermediate network to a host computer in accordance with some embodiments.

Figure 9:
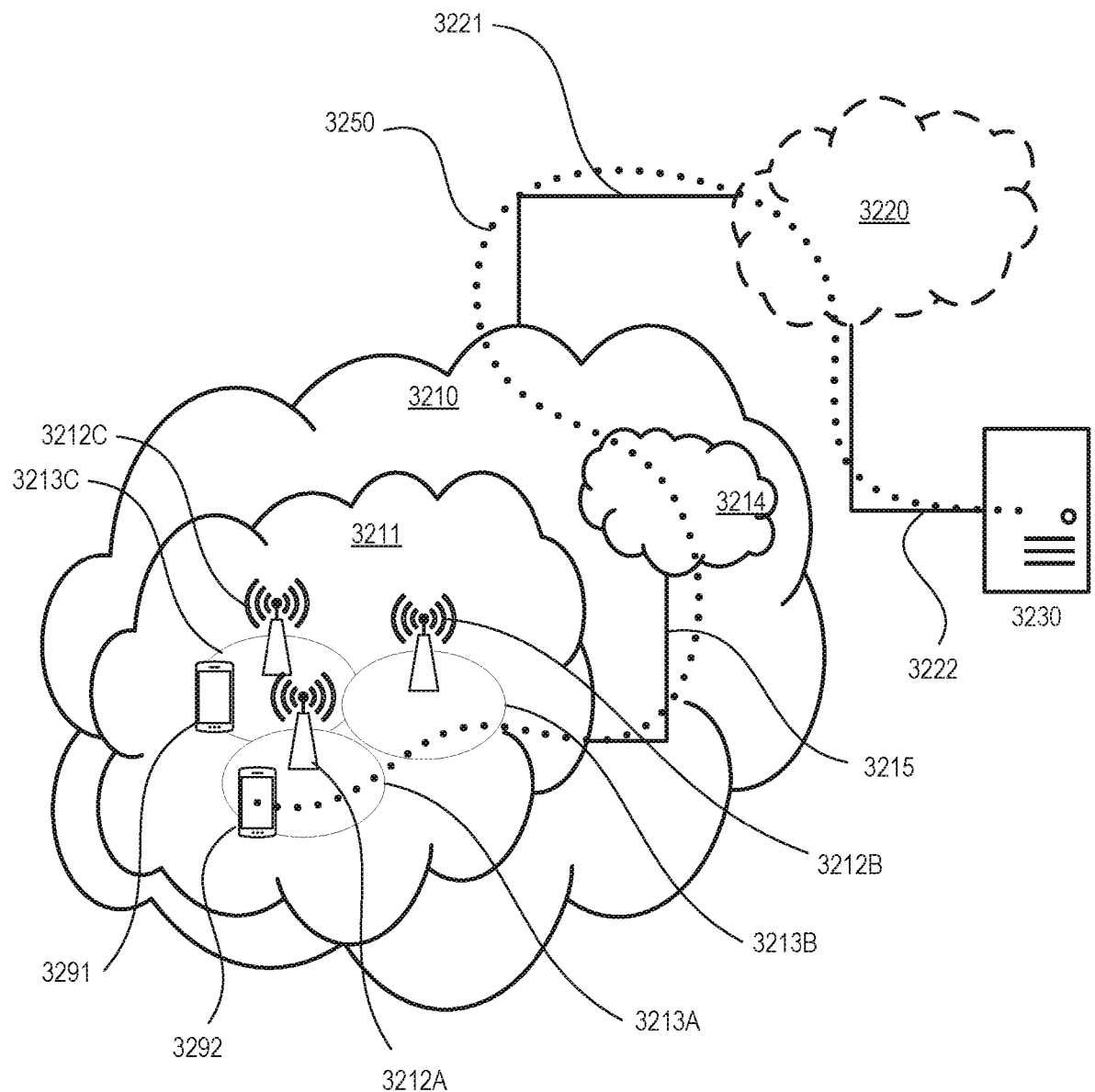
FIG. 9 is a schematic block diagram illustrating a telecommunication network connected via an intermediate network to a host computer.

With reference to FIG. 9, in accordance with an embodiment, a communication system includes telecommunication network 3210 such as the communications system 100, for example, a 3GPP-type cellular network, which comprises access network 3211, such as a radio access network, and core network 3214. Access network 3211 comprises a plurality of network nodes 105. For example, base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A plurality of user equipments, such as the UE 101 may be comprised in the communications system 100. In FIG. 9, a first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212. Any of the UEs 3291, 3292 may be considered examples of the UE 101.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network;

intermediate network 3220, if any, may be a backbone network or the Internet; in particular, intermediate network 3220 may comprise two or more sub-networks (not shown).

The communication system of FIG. 9 as a whole enables connectivity between the connected UEs 3291, 3292 and host computer 3230. The connectivity may be described as an Over-The-Top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded, e.g., handed over, to a connected UE 3291. Similarly, base station 3212 need not be aware of the future routing of an outgoing uplink communication originating from the UE 3291 towards the host computer 3230.

In relation to FIGS. 10-14 which are described next, it may be understood that the base station may be considered an example of the first network node 103.

Figure 10:
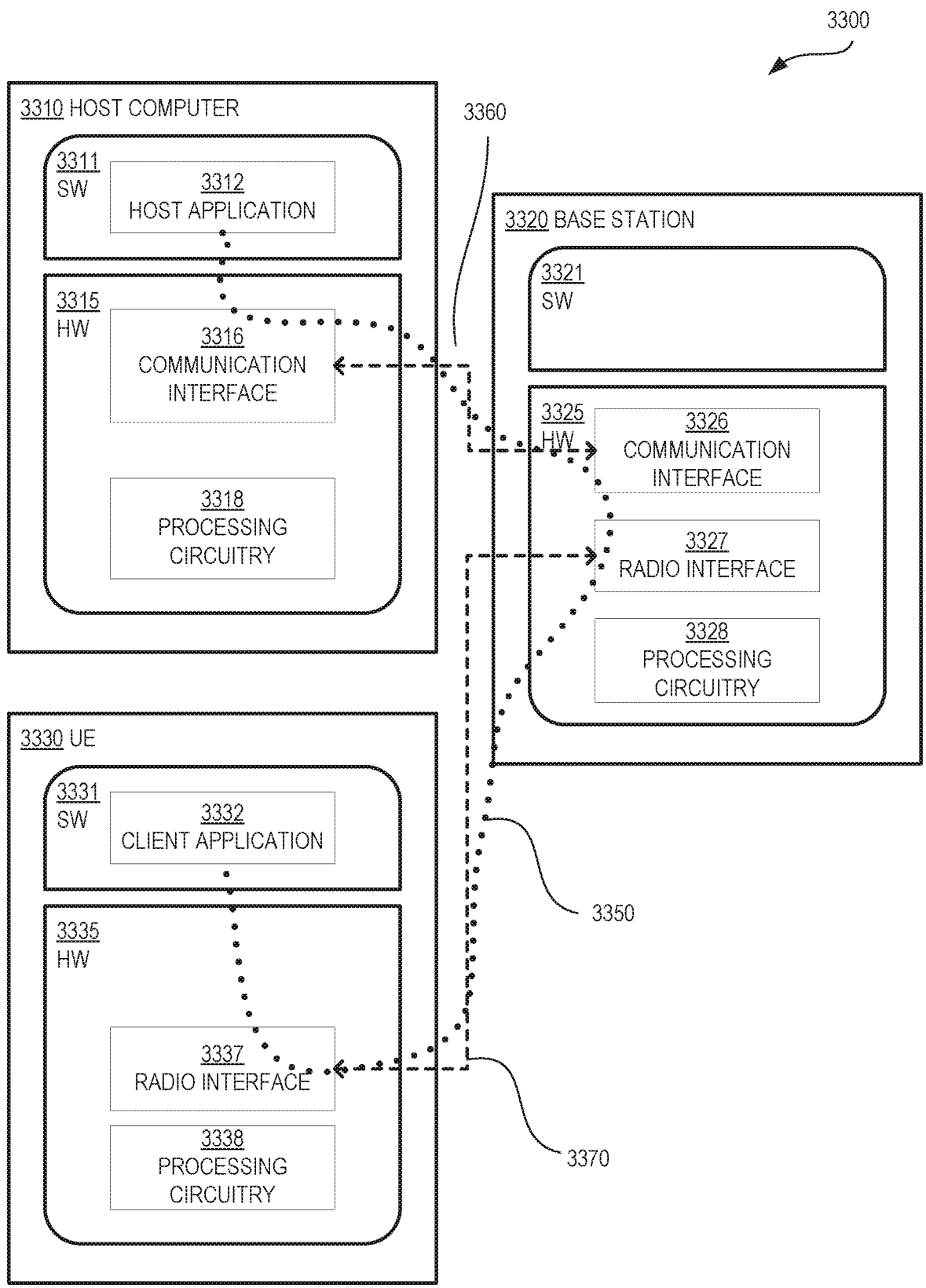
FIG. 10 is a schematic block diagram of a host computer communicating via a base station with a UE over a partially wireless connection.

FIG. 10 illustrates an example of host computer communicating via a first network node 103 with a UE 101 over a partially wireless connection in accordance with some embodiments.

The UE 101 and the first network node 103, e.g., a base station and host computer discussed in the preceding paragraphs will now be described with reference to FIG. 10. In communication system 3330, such as the communications system 100, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, ASIC, Field Programmable Gate Arrays (FPGA) or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes the first network node 103 exemplified in FIG. 10 as a base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with the UE 101, exemplified in FIG. 10 as a UE 3330 located in a coverage area served by base station 3320. Communication interface 3326 may be configured to facilitate connection 3360 to host computer 3310. Connection 3360 may be direct or it may pass through a core network (not shown in FIG. 10) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. It's hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 10 may be similar or identical to host computer 3230, one of base stations 3212*a*, 3212*b*, 3212*c* and one of UEs 3291, 3292 of FIG. 9, respectively. This is to say, the inner workings of these entities may be as shown in FIG. 10 and independently, the surrounding network topology may be that of FIG. 9.

In FIG. 10, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing, e.g., on the basis of load balancing consideration or reconfiguration of the network.

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the spectrum efficiency, and latency, and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figures 11, 12:
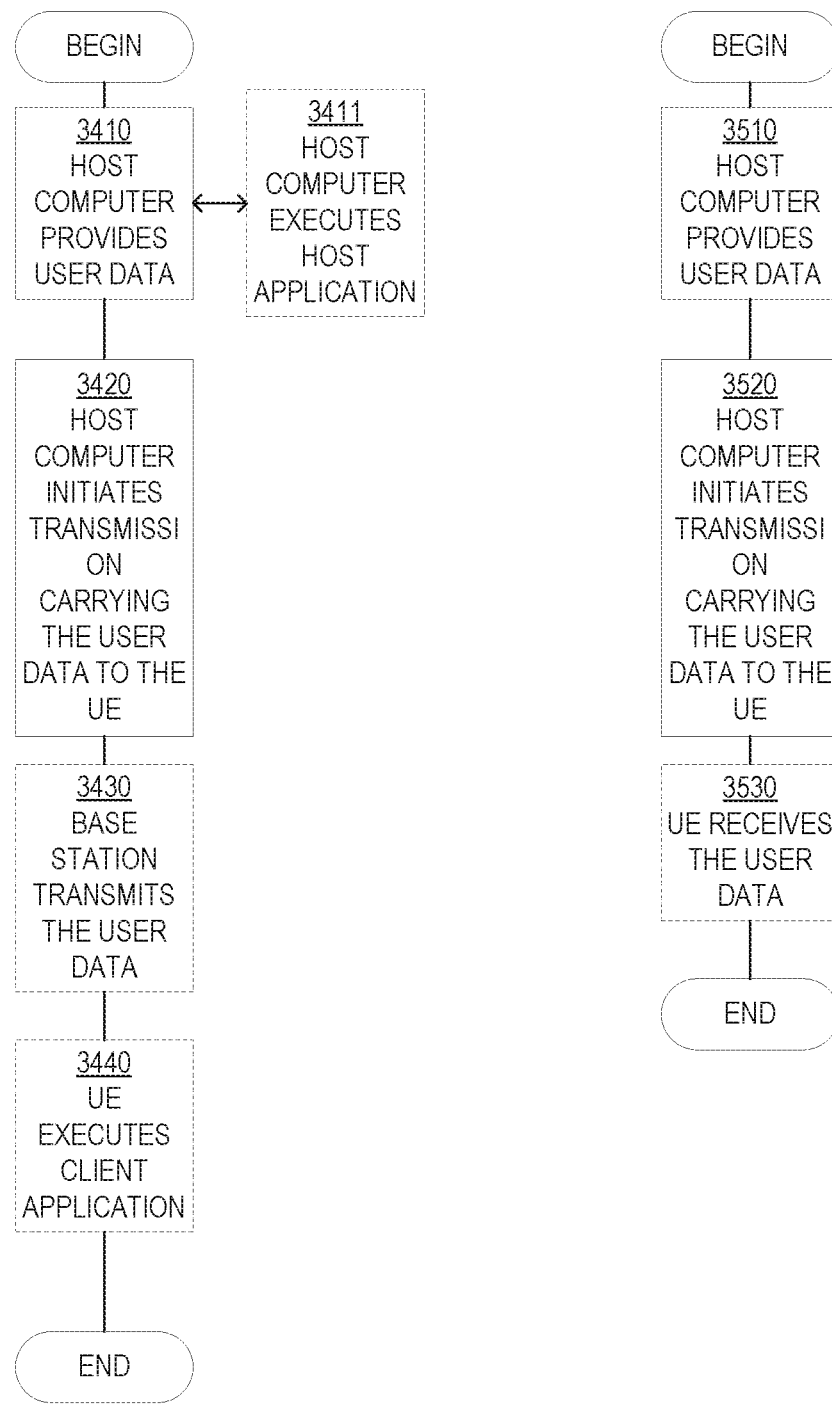
FIG. 11 is a flowchart depicting embodiments of a method in a communications system including a host computer, a base station and a UE.
FIG. 12 is a flowchart depicting embodiments of a method in a communications system including a host computer, a base station and a UE.

FIG. 11 illustrates an example of methods implemented in a communication system 100 including a host computer, a base station 103 and a UE 101. FIG. 11 is a flowchart illustrating a method implemented in a communication system 100. The communication system 100 includes a host computer, a base station 103 and a UE 101 which may be those described with reference to FIG. 9 and FIG. 10. For simplicity of the present disclosure, only drawing references to FIG. 11 will be included in this section. In step 3410, the host computer provides user data. In substep 3411 (which may be optional) of step 3410, the host computer provides the user data by executing a host application. In step 3420, the host computer initiates a transmission carrying the user data to the UE 101. In step 3430 (which may be optional), the base station 103 transmits to the UE 101 the user data which was carried in the transmission that the host computer initiated, in accordance with the teachings of the embodiments described throughout this disclosure. In step 3440 (which may also be optional), the UE 101 executes a client application associated with the host application executed by the host computer.

FIG. 12 illustrates methods implemented in a communication system 100 including a host computer, a base station 103 and a UE 101 in accordance with some embodiments. FIG. 12 is a flowchart illustrating a method implemented in a communication system 100. The communication system 100 includes a host computer, a base station 103 and a UE 101 which may be those described with reference to FIG. 9 and FIG. 10. For simplicity of the present disclosure, only drawing references to FIG. 12 will be included in this section. In step 3510 of the method, the host computer provides user data. In an optional substep (not shown) the host computer provides the user data by executing a host application. In step 3520, the host computer initiates a transmission carrying the user data to the UE 101. The transmission may pass via the base station 103, in accordance with the teachings of the embodiments described throughout this disclosure. In step 3530 (which may be optional), the UE 101 receives the user data carried in the transmission.

Figures 13, 14:
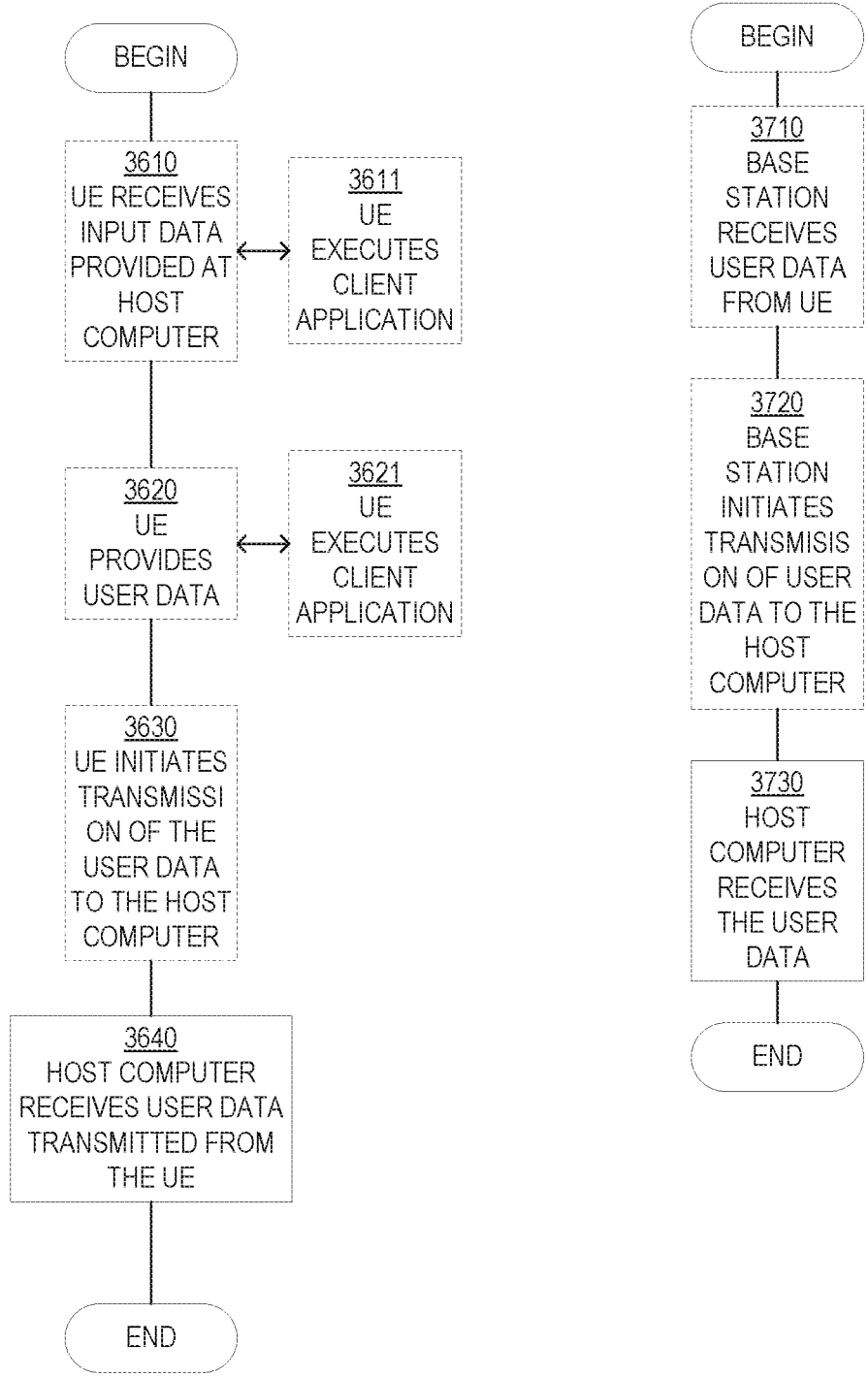
FIG. 13 is a flowchart depicting embodiments of a method in a communications system including a host computer, a base station and a UE.
FIG. 14 is a flowchart depicting embodiments of a method in a communications system including a host computer, a base station and a UE.

FIG. 13 illustrates methods implemented in a communication system 100 including a host computer, a base station 103 and a UE 101. FIG. 13 is a flowchart illustrating a method implemented in a communication system 100. The communication system 100 includes a host computer, a first network node 103 and a UE 101 which may be those described with reference to FIG. 9 and FIG. 10. For simplicity of the present disclosure, only drawing references to FIG. 13 will be included in this section. In step 3610 (which may be optional), the UE 101 receives input data provided by the host computer. Additionally or alternatively, in step 3620, the UE 101 provides user data. In substep 3621 (which may be optional) of step 3620, the UE provides the user data by executing a client application. In substep 3611 (which may be optional) of step 3610, the UE 101 executes a client application which provides the user data in reaction to the received input data provided by the host computer. In providing the user data, the executed client application may further consider user input received from the user. Regardless of the specific manner in which the user data was provided, the UE 101 initiates, in substep 3630 (which may be optional), transmission of the user data to the host computer. In step 3640 of the method, the host computer receives the user data transmitted from the UE 101, in accordance with the teachings of the embodiments described throughout this disclosure.

FIG. 14 illustrates methods implemented in a communication system 100 including a host computer, a base station 103 and a UE 101. FIG. 14 is a flowchart illustrating a method implemented in a communication system 100. The communication system 100 includes a host computer, a base station 103 and a UE 101 which may be those described with reference to FIG. 9 and FIG. 10. For simplicity of the present disclosure, only drawing references to FIG. 14 will be included in this section. In step 3710 (which may be optional), in accordance with the teachings of the embodiments described throughout this disclosure, the base station 103 receives user data from the UE 101. In step 3720 (which may be optional), the base station 103 initiates transmission of the received user data to the host computer. In step 3730 (which may be optional), the host computer receives the user data carried in the transmission initiated by the base station 103.

Some embodiments may be summarized as follows:

A base station 103 configured to communicate with a UE 101. The base station 103 comprises a radio interface and processing circuitry configured to perform one or more of the actions described herein as performed by the first network node 103.

A communication system 100 including a host computer comprising:
  processing circuitry configured to provide user data; and
  a communication interface configured to forward the user data to a cellular network for transmission to a UE 101,
  the cellular network comprises a first network node 103 having a radio interface and processing circuitry, the base station's processing circuitry configured to perform one or more of the actions described herein as performed by the first network node 103.

The communication system 100 may further including the first network node 103.

The communication system 100 may further include the UE 101. The UE 101 is configured to communicate with the first network node 103.

The communication system 100, wherein:
the processing circuitry of the host computer is configured to execute a host application, thereby providing the user data; and
the UE 101 comprises processing circuitry configured to execute a client application associated with the host application.

A method implemented in a first network node 103, comprising one or more of the actions described herein as performed by the first network node 103.

A method implemented in a communication system 100 including a host computer, a base station 103 and a UE 101, the method comprising:
at the host computer, providing user data; and
at the host computer, initiating a transmission carrying the user data to the UE 101 via a cellular network comprising the first network node 103, wherein the first network node 103 performs one or more of the actions described herein as performed by the first network node 103.

The method may further comprise:
at the first network node 103, transmitting the user data.

The user data may be provided at the host computer by executing a host application, and the method may further comprise:
at the UE 101, executing a client application associated with the host application.

A UE 101 configured to communicate with a first network node 103, the UE 101 comprising a radio interface and processing circuitry configured to perform one or more of the actions described herein as performed by the UE 101.

A communication system 100 including a host computer comprising:
processing circuitry configured to provide user data; and
a communication interface configured to forward user data to a cellular network for transmission to a UE 101,
the UE 101 comprises a radio interface and processing circuitry, the UE's processing circuitry configured to perform one or more of the actions described herein as performed by the UE 101.

The communication system 100 may further including the UE 101.

The communication system 100 further includes a first network node 103 configured to communicate with the UE 101.

The communication system 100, wherein:
the processing circuitry of the host computer is configured to execute a host application, thereby providing the user data; and
the UE's processing circuitry is configured to execute a client application associated with the host application.

A method implemented in a UE 101 comprising one or more of the actions described herein as performed by the UE 101.

A method implemented in a communication system 100 including a host computer, a first network node 103 and a UE 101, the method comprising:
at the host computer, providing user data; and
at the host computer, initiating a transmission carrying the user data to the UE 101 via a cellular network comprising the base station 103. The UE 101 performs one or more of the actions described herein as performed by the UE 101.

The method may further comprise:
at the UE 101, receiving the user data from the first network node 103.

A UE 101 configured to communicate with a first network node 103, the UE 101 comprising a radio interface and processing circuitry configured to perform one or more of the actions described herein as performed by the UE 101.

A communication system 100 including a host computer comprising:
a communication interface configured to receive user data originating from a transmission from a UE 101 to a first network node 103,
the UE 101 comprises a radio interface and processing circuitry, the UE's processing circuitry configured to:
perform one or more of the actions described herein as performed by the UE 101.

The communication system 100 may further include the UE 101.

The communication system 100 may further include the first network node 103. The first network node 103 comprises a radio interface configured to communicate with the UE 101 and a communication interface configured to forward to the host computer the user data carried by a transmission from the UE 101 to the base station 103.

The communication system 100, wherein:
the processing circuitry of the host computer is configured to execute a host application; and
the UE's processing circuitry is configured to execute a client application associated with the host application, thereby providing the user data.

The communication system 100, wherein:
the processing circuitry of the host computer is configured to execute a host application, thereby providing request data; and
the UE's processing circuitry is configured to execute a client application associated with the host application, thereby providing the user data in response to the request data.

A method implemented in a UE 101 comprising one or more of the actions described herein as performed by the UE 101.

The method may further comprise:
providing user data; and
forwarding the user data to a host computer via the transmission to the first network node 103.

A method implemented in a communication system 100 including a host computer, a first network node 103 and a UE 101, the method comprising:
at the host computer, receiving user data transmitted to the first network node 103 from the UE 101. The UE 101 performs one or more of the actions described herein as performed by the UE 101.

The method may further comprise:
at the UE 101, providing the user data to the first network node 103.

The method may further comprise:
at the UE 101, executing a client application, thereby providing the user data to be transmitted; and
at the host computer, executing a host application associated with the client application.

The method may further comprise:
at the UE 101, executing a client application; and
at the UE 101, receiving input data to the client application, the input data being provided at the host computer by executing a host application associated with the client application,
the user data to be transmitted is provided by the client application in response to the input data.

A first network node 103 configured to communicate with a UE 101, the first network node 103 comprising a radio interface and processing circuitry configured to perform one or more of the actions described herein as performed by the network node 103.

A communication system 100 including a host computer comprising a communication interface configured to receive user data originating from a transmission from a UE 101 to a base station 103. The first network node 103 comprises a radio interface and processing circuitry. The base station's processing circuitry is configured to perform one or more of the actions described herein as performed by the first network node 103.

The communication system 100 may further include the first network node 103.

The communication system 100 may further include the UE 101. The UE 101 is configured to communicate with the first network node 103.

The communication system 100 wherein:
the processing circuitry of the host computer is configured to execute a host application;
the UE 101 is configured to execute a client application associated with the host application, thereby providing the user data to be received by the host computer.

A method implemented in a first network node 103, comprising one or more of the actions described herein as performed by any of the first network node 103.

A method implemented in a communication system including a host computer, a first network node 103 and a UE 101, the method comprising:
at the host computer, receiving, from the first network node 103, user data originating from a transmission which the base station has received from the UE 101. The UE 101 performs one or more of the actions described herein as performed by the UE 101.

The method may further comprise:
at the first network node 103, receiving the user data from the UE 101.

The method may further comprise:
at the first network node 103, initiating a transmission of the received user data to the host computer.

The embodiments herein relate to get the UE capability as before MME 105 creates the session towards the SGW 108, or choose the DCN. To get the UE LTE-M RAT type in first message, the eNB 130 sends to the MME 105, i.e. the INITIAL UE MESSAGE, or at least before the MME 105 creates the session towards the SGW 108. It is also possible that the network wants to handle the normal UE using CE in the same way as it handles the LTE-M UEs, when it is related to charging and roaming blocking. The solution is also provided.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step.

Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description. In general, the usage of first, second, third, fourth, and/or fifth herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

The embodiments herein are not limited to the above described embodiments. Various alternatives, modifications and equivalents may be used. Therefore, the above embodiments should not be taken as limiting the scope of the embodiments. A feature from one embodiment may be combined with one or more features of any other embodiment.

The term at least one of A and B should be understood to mean only A, only B, or both A and B, where A and B are any parameter, number, indication used herein etc.

It should be emphasized that the term comprises/comprising when used in this specification is taken to specify the presence of stated features, integers, steps or components, but does not preclude the presence or addition of one or more other features, integers, steps, components or groups thereof. It should also be noted that the words a or an preceding an element do not exclude the presence of a plurality of such elements.

The term configured to used herein may also be referred to as arranged to, adapted to, capable of or operative to.

It should also be emphasized that the steps of the methods may, without departing from the embodiments herein, be performed in another order than the order in which they appear herein.

Abbreviations

Figure 1:
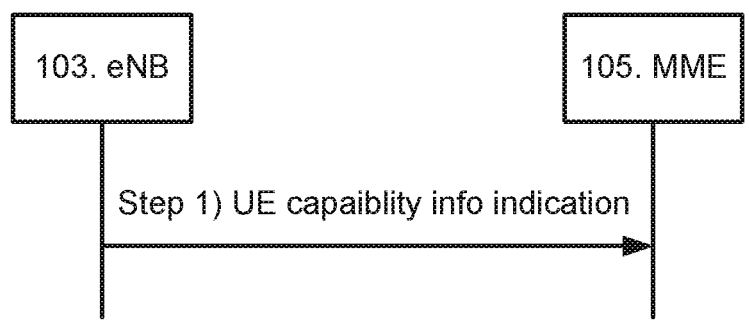
FIG. 1 is a signalling diagram illustrating a method.

IoT Internet of Things
CAT-M Category M
BL Bandwidth reduced Low complexity
CE Coverage Enhancement
DCN Dedicated CN
LTE-M UEs An LTE-M indication is sent from the RAN node 103 to the MME 105 in UE CAPABILITY INFO INDICATION. The procedure may be as illustrated in FIG. 1.
UE Category Information Indication The purpose of the UE category information procedure is to enable the eNB 103 to provide to the MME UE category-related information. The UE category information may be referred to as UE capability information, UE category indication or UE capability indication.

FIG. 1 shows the UE category information procedure. Successful operation.

The eNB 103 controlling a UE-associated logical S1-connection initiates the procedure by sending a UE CAPABILITY INFO INDICATION message to the MME 105 including the UE capability information. The UE CAPABILITY INFO INDICATION message may also include paging specific UE capability information within the UE Radio Capability for Paging IE. The UE capability information received by the MME 105 shall replace previously stored corresponding UE capability information in the MME 105 for the UE 101, as described in TS 23.401.

If UE CAPABILITY INFO INDICATION message contains the LTE-M indication IE, the MME 105 shall, if supported, use it according to TS 23.401.

Figure 2:
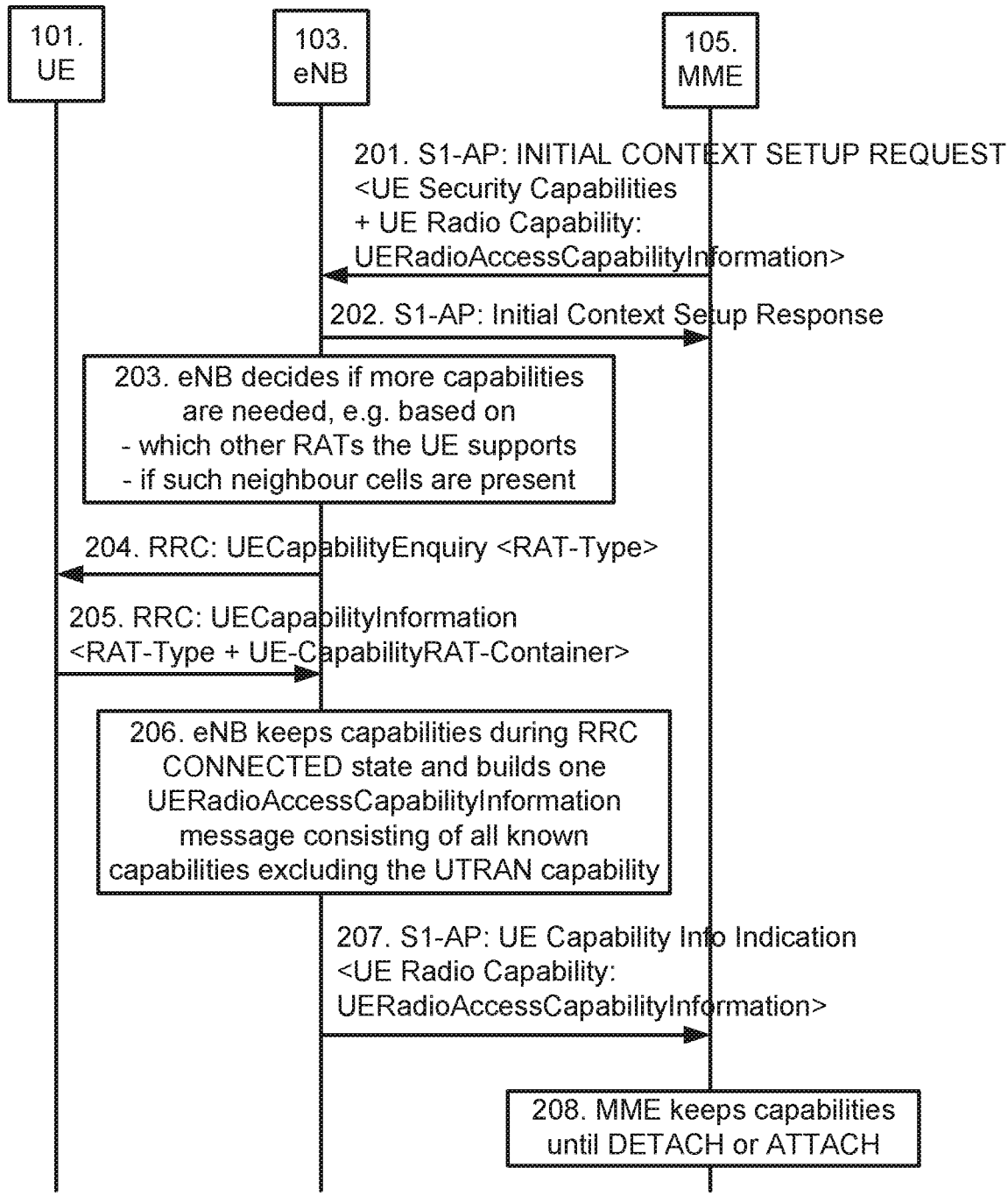
FIG. 2 is a signalling diagram illustrating a method.

If the UE 101 indicates the support for UE Application Layer Measurement, the eNB 103 shall if supported include the UE Application Layer Measurement Capability IE in the UE CAPABILITY INFO INDICATION message. The MME 105 shall, if supported, store and use the information when initiating UE Application Layer Measurement In TS 36.300, the capability handling is specified as seen in FIG. 2:

When is LTE-M Indication Needed in CN?

During initial attach procedure, the UE 101 does random access and the first message from the eNB 103 to the CN is INITIAL UE MESSAGE. At this stage, the eNB 103 does not have the UE capability information. The MME 105 requests the eNB 103 to enquire the UE capability in the Initial Context Setup Request. The MME 105 stores UE capability information until the UE 101 is detached.

SA2 introduced a new RAT type for LTE-M in order to apply a separate charging model for traffic from an LTE-M UE and to introduce requirements for identification and transparency when roaming.

To fulfil those requirements, the MME 105 needs to indicate whether a UE 101 is category M1/M2 to the S-GW/P-GW 108 as a new RAT type in Create Session Request. The MME 105 also needs to block inbound roaming for category M1/M2 UEs in the initial attach if it is required by the operator.

But with the current solution in 3GPP, which uses category M1/M2 to assign the new RAT type LTE-M in the core network, the MME 105 can only get explicit LTE-M indication in the UE CAPABILITY INFO INDICATION. This would lead to the problems below:

In the attach procedure, when the MME 105 receives the Initial UE message, it will send Create Session Request to the SGW 108 and indicate to the SGW 108 that this is for an LTE-M1/M2 UE for charging. However, the UE capability, if not available at the MME 105, can be received from the eNB 103 after Initial Context Setup Request/Response (ICSR), which would be late.

For block roaming a category M1/M2 UE, this would mean that the UE 101 will always be accepted for the attach procedure and when the MME 105 receives the UE capability after ICSR, the UE 101 may be detached. This means the roaming category M UE can access the network for communication during initial attach even though it should be blocked.

For DCN selection, category M1/M2 UEs may be routed to a wrong DCN in the attach, the UUT setting now is per IMSI level, however, if an MBB USIM is inserted into a category M1/M2 UE. After the MME 105 in the wrong DCN receives the UE capabilities, a re-route may be needed to steer the UE 101 to the correct DCN. It requires additional network signaling and the reroute may not happen immediately.

In the current specification, indication for category LTE-M1/M2 UEs is received by the CN in UE Capability Information after the UE context and user plane has been setup. This is too late.

Solutions

Before a UE 101 sends Msg1, e.g. RACH Preamble, it has to determine what kind of RACH resource it should use. This information is broadcast via SIB2.

If the UE 101 is a BL UE or a UE 101 in enhanced coverage, the eNB 103 would be aware during random access procedure.

One solution is network side solution:

When eNB 103 is aware the UE 101 is BL UE or a UE in enhanced coverage during random access procedure, the eNB indicates this to MME 105.

Depending on the operator policy, if the normal UE using CE is to be treated the same as category M1/M2 UE for charging, routing to DCN or roaming handling purpose, the MME 105 could use this indication as if the UE 101 is of LTE-M type at CN network side.

If the MME 105 needs to different and make sure the UE 101 is of category M1/M2 category, it may initial capability request towards the eNB 103.

The drawback of this solution is extra signaling or some ambiguity.

One solution is the UE side solution:

Similar to the indication for CE Mode B support provided in RRCConnectionSetupComplete message, a new indication is introduced to inform the eNB 103 whether the UE 101 is a category M1/M2 UE or a normal category UE in CE. See below for details. The eNB 103 then can include the LTE-M Indication in Initial UE Message. The indication should be early implementable.

RRCConnectionSetupComplete

The RRCConnectionSetupComplete message is used to confirm the successful completion of an RRC connection establishment.

Signalling radio bearer: SRB1
RLC-SAP: AM
Logical channel: DCCH
Direction: UE to E-UTRAN RRCConnectionSetupComplete message

```
-- ASN1START
RRCConnectionSetupComplete ::=      SEQUENCE {
    rrc-TransactionIdentifier       RRC-TransactionIdentifier,
    criticalExtensions              CHOICE {
        c1                              CHOICE {
            rrcConnectionSetupComplete-r8   RRCConnectionSetupComplete-r8-IEs,
            spare3 NULL, spare2 NULL, spare1 NULL
        },
        criticalExtensionsFuture        SEQUENCE { }
    }
}
RRCConnectionSetupComplete-r8-IEs ::= SEQUENCE {
    selectedPLMN-Identity           INTEGER (1..maxPLMN-r11),
    registeredMME                   RegisteredMME                               OPTIONAL,
    dedicatedInfoNAS                DedicatedInfoNAS,
    nonCriticalExtension            RRCConnectionSetupComplete-v8a0-IEs         OPTIONAL
}
```

-continued

| RRCConnectionSetupComplete message |
|---|

```
RRCConnectionSetupComplete-v8a0-IEs ::= SEQUENCE {
    lateNonCriticalExtension        OCTET STRING                                            OPTIONAL,
    nonCriticalExtension            RRCConnectionSetupComplete-v1020-IEs        OPTIONAL
}
RRCConnectionSetupComplete-v1020-IEs ::= SEQUENCE {
    gummei-Type-r10                 ENUMERATED {native, mapped}                             OPTIONAL,
    rlf-InfoAvailable-r10           ENUMERATED {true}                                       OPTIONAL,
    logMeasAvailable-r10            ENUMERATED {true}                                       OPTIONAL,
    m-SubframeConfigReq-r10         ENUMERATED {required, notRequired}                      OPTIONAL,
    nonCriticalExtension            RRCConnectionSetupComplete-v1130-IEs        OPTIONAL
}
RRCConnectionSetupComplete-v1130-IEs ::= SEQUENCE {
    connEstFailInfoAvailable-r11    ENUMERATED {true}                           OPTIONAL,
    nonCriticalExtension            RRCConnectionSetupComplete-v1250-IEs        OPTIONAL
}
RRCConnectionSetupComplete-v1250-IEs ::= SEQUENCE {
    mobilityState-r12               ENUMERATED {normal, medium, high, spare}                OPTIONAL,
    mobilityHistoryAvail-r12        ENUMERATED {true}                                       OPTIONAL,
    logMeasAvailableMBSFN-r12       ENUMERATED {true}                                       OPTIONAL,
    nonCriticalExtension            RRCConnectionSetupComplete-v1320-IEs        OPTIONAL
}
RRCConnectionSetupComplete-v1320-IEs ::= SEQUENCE {
    ce-ModeB-r13                    ENUMERATED {supported}                                  OPTIONAL,
    s-TMSI-r13                      S-TMSI
OPTIONAL,
    attachWithoutPDN-Connectivity-r13   ENUMERATED {true}                                   OPTIONAL,
    up-CIoT-EPS-Optimisation-r13    ENUMERATED {true}                                       OPTIONAL,
    cp-CIoT-EPS-Optimisation-r13    ENUMERATED {true}                                       OPTIONAL,
    nonCriticalExtension            RRCConnectionSetupComplete-v1330-IEs        OPTIONAL
}
RRCConnectionSetupComplete-v1330-IEs ::= SEQUENCE {
    ue-CE-NeedULGaps-r13            ENUMERATED {true}                                       OPTIONAL,
    nonCriticalExtension            RRCConnectionSetupComplete-v1430-IEs        OPTIONAL
}
RRCConnectionSetupComplete-v1430-IEs ::= SEQUENCE {
    dcn-ID-r14                      INTEGER (0..65535)                                      OPTIONAL,
    nonCriticalExtension            RRCConnectionSetupComplete-v1530-IEs        OPTIONAL
}
RRCConnectionSetupComplete-v1530-IEs ::= SEQUENCE {
    logMeasAvailableBT-r15          ENUMERATED {true}                                       OPTIONAL,
    logMeasAvailableWLAN-r15        ENUMERATED {true}                                       OPTIONAL,
    idleMeasAvailable-r15           ENUMERATED {true}                                       OPTIONAL,
    flightPathInfoAvailable-r15     ENUMERATED {true}                                       OPTIONAL,
    connectTo5GC-r15                ENUMERATED {true}                                       OPTIONAL,
    registeredAMF-r15               RegisteredAMF-r15                                       OPTIONAL,
    s-NSSAI-list-r15                SEQUENCE(SIZE (1..maxNrofS-NSSAI-r15)) OF S-NSSAI-r15   OPTIONAL,
    ng-5G-S-TMSI-Bits-r15           CHOICE {
        ng-5G-S-TMSI-r15                NG-5G-S-TMSI-r15,
        ng-5G-S-TMSI-Part2-r15          BIT STRING (SIZE (8))
    }                                                                                       OPTIONAL,
    nonCriticalExtension            RRCConnectionSetupComplete-v1540-IEs        OPTIONAL
}
RRCConnectionSetupComplete-v1540-IEs ::= SEQUENCE {
    gummei-Type-v1540               ENUMERATED {mappedFrom5G}                               OPTIONAL,
    guami-Type-r15                  ENUMERATED {native, mapped}                             OPTIONAL,
    nonCriticalExtension            SEQUENCE { }                                OPTIONAL
}
RegisteredMME ::=                   SEQUENCE {
    plmn-Identity                   PLMN-Identity                                           OPTIONAL,
    mmegi                           BIT STRING (SIZE (16)),
    mmec                            MMEC
}
RegisteredAMF-r15 ::=               SEQUENCE {
    plmn-Identity-r15               PLMN-Identity                                           OPTIONAL,
    amf-Identifier-r15              AMF-Identifier-r15
}
-- ASN1STOP
```

| RRCConnectionSetupComplete field descriptions |
|---| attachWithoutPDN-Connectivity
This field is used to indicate that the UE performs an Attach without PDN connectivity
procedure, as indicated by the upper layers and specified in TS 24.301.
cp-CIoT-EPS-Optimisation

| RRCConnectionSetupComplete field descriptions |
| --- |
| This field is included when the UE supports the Control plane CIoT EPS Optimisation, as indicated by the upper layers, see TS 24.301.
ce-ModeB
Indicates whether the UE supports operation in CE mode B, as specified in TS 36.306.
connectTo5GC
This field is not used in the specification. It shall not be sent by the UE.
dcn-ID
The Dedicated Core Network Identity, see TS 23.401.
guami-Type
This field is used to indicate whether the GUAMI included is native (derived from native 5G-GUTI) or mapped (from EPS, derived from EPS GUTI).
gummei-Type
This field is used to indicate whether the GUMMEI included is native (assigned by EPC) or mapped. The value native indicates the GUMMEI is native, mapped indicates the GUMMEI is mapped from 2G/3G identifiers, and mappedFrom5G indicates the GUMMEI is mapped from 5G identifiers. A UE that sets gummei-Type-v1540 to mappedFrom5G shall also include gummei-Type-r10 and set it to native.
idleMeasAvailable
Indication that the UE has idle mode measurement report available.
mmegi
Provides the Group Identity of the registered MME within the PLMN, as provided by upper layers, see TS 23.003.
mobilityState
This field indicates the UE mobility state (as defined in TS 36.304, clause 5.2.4.3) just prior to UE going into RRC_CONNECTED state. The UE indicates the value of medium and high when being in Medium-mobility and High-mobility states respectively. Otherwise the UE indicates the value normal.
ng-5G-S-TMSI-Part2
The leftmost 8 bits of 5G-S-TMSI.
registeredMME
This field is used to transfer the GUMMEI of the MME where the UE is registered, as provided by upper layers.
rn-SubframeConfigReq
If present, this field indicates that the connection establishment is for an RN and whether a subframe configuration is requested or not.
attachWithoutPDN-Connectivity
This field is used to indicate that the UE performs an Attach without PDN connectivity procedure, as indicated by the upper layers and specified in TS 24.301.
cp-CIoT-EPS-Optimisation
This field is included when the UE supports the Control plane CIoT EPS Optimisation, as indicated by the upper layers, see TS 24.301.
ce-ModeB
Indicates whether the UE supports operation in CE mode B, as specified in TS 36.306.
connectTo5GC
This field is not used in the specification. It shall not be sent by the UE.
dcn-ID
The Dedicated Core Network Identity, see TS 23.401.
guami-Type
This field is used to indicate whether the GUAMI included is native (derived from native 5G-GUTI) or mapped (from EPS, derived from EPS GUTI).
gummei-Type
This field is used to indicate whether the GUMMEI included is native (assigned by EPC) or mapped. The value native indicates the GUMMEI is native, mapped indicates the GUMMEI is mapped from 2G/3G identifiers, and mappedFrom5G indicates the GUMMEI is mapped from 5G identifiers. A UE that sets gummei-Type-v1540 to mappedFrom5G shall also include gummei-Type-r10 and set it to native.
selectedPLMN-Identity
Index of the PLMN selected by the UE from the plmn-IdentityList fields included in SIB1. 1 if the 1st PLMN is selected from the 1st plmn-IdentityList included in SIB1, 2 if the 2nd PLMN is selected from the same plmn-IdentityList, or when no more PLMN are present within the same plmn-IdentityList, then the PLMN listed 1st in the subsequent plmn-IdentityList within the same SIB1 and so on.
s-NSSAI-List
This field is a list of S-NSSAI as indicated by the upper layers. The UE can report up to eight S-NSSAI per NSSAI, see TS 23.003.
ue-CE-NeedULGaps
Indicates whether the UE needs uplink gaps during continuous uplink transmission in FDD as specified in TS 36.211 and TS 36.306.
up-CIoT-EPS-Optimisation
This field is included when the UE supports the User plane CIoT EPS Optimisation, as indicated by the upper layers, see TS 24.301. |

In the current specification, indication for category LTE-M1/M2 UEs is received by the CN in UE Capability Information after the UE context and user plane has been setup. This is too late.

The invention claimed is:

1. A method performed by a first network node, the method comprising:
   determining which User Equipment, UE, category a UE belongs to, wherein the UE category is M or non-Bandwidth reduced Low complexity, BL in Coverage Enhancement, CE; and
   providing UE category information about the determined UE category to a second network node;
   wherein the first network node determines that the UE belongs to category M when it has not detected any indication for non-BL in CE;
   wherein when the first network node detects that a special preamble is used, then it determines that UE category information needs to be provided.

2. The method according to claim 1, wherein the determining of the UE category comprises detecting the UE category in a random access procedure.

3. The method according to claim 1, wherein the UE category is determined based on an indication received from the UE.

4. The method according to claim 1, comprising:
   receiving, from the second network node, an indication of that the second network node wants to know the UE category information.

5. The method according to claim 1, wherein determining comprises determining the category from a preamble received during a random access procedure using information broadcasted by the UE about radio resources used by UE.

6. A first network node, adapted to:
   determine which User Equipment, UE, category a UE belongs to, wherein the UE category is M or non-Bandwidth reduced Low complexity, BL in Coverage Enhancement, CE; and to
   provide UE category information about the determined UE category to a second network node;
   wherein the first network node determines that the UE belongs to category M when it has not detected any indication for non-BL in CE;
   wherein when the first network node detects that a special preamble is used, then it is adapted to determine that UE category information needs to be provided.

7. The first network node according to claim 6, adapted to determine the UE category by detecting the UE category in a random access procedure.

8. The first network node according to claim 6, adapted to determine the UE category based on an indication received from the UE.

9. The first network node according to claim 6, adapted to:
   receive, from the second network node, an indication of that the second network node wants to know the UE category information.

10. The first network node according to claim 6, wherein determining comprises being adapted to determine the category from a preamble received during a random access procedure using information broadcasted by the UE about radio resources used by UE.

11. A method performed by a second network node, the method comprising:
    obtaining, from the first network node, User Equipment, UE, category information about which UE category a UE belongs to, wherein the UE category is M or non-Bandwidth reduced Low complexity, BL in Coverage Enhancement, CE; and
    providing the UE category information to a third network node;
    wherein the first network node determines that the UE belongs to category M when it has not detected any indication for non-BL in CE;
    wherein when the first network node detects that a special preamble is used, then it determines that UE category information needs to be provided.

12. The method according to claim 11, comprising:
    determining that the second network node wants to know the UE category information; and
    transmitting, to the first network node, an indication of that the second network node wants to know the UE category information.

13. The method according to claim 11, comprising:
    determining whether it wants to treat UEs of all categories in the same or different way related to at least one of charging and roaming.

14. The method according to claim 13, when the second network node has determined that it should treat UEs of a certain category in a different way than UEs of other categories, then the second network node requests the first network node for UE capability information from the UE.

15. The method according to claim 11, comprising:
    utilizing the UE category information to apply Dedicated Core Network, DCN, charging or a roaming policy.

16. A second network node adapted to:
    obtain, from the first network node, User Equipment, UE, category information about which UE category a UE belongs to, wherein the UE category is M or non-Bandwidth reduced Low complexity, BL in Coverage Enhancement, CE; and to
    provide the UE category information to a third network node;
    wherein the first network node determines that the UE belongs to category M when it has not detected any indication for non-BL in CE;
    wherein when the first network node detects that a special preamble is used, then it determines that UE category information needs to be provided.

17. The second network node according to claim 16, adapted to:
    determine that the second network node wants to know the UE category information; and to
    transmit, to the first network node, an indication of that the second network node wants to know the UE category information.

18. The second network node according to claim 16, adapted to:
    determine whether it wants to treat UEs of all categories in the same or different way related to at least one of charging and roaming.

19. The second network node according to claim 18, when the second network node has determined that it should treat UEs of a certain category in a different way than UEs of other categories, then the second network node is adapted to request the first network node for UE capability information from the UE.

20. The second network node according to claim 16, adapted to:
    utilize the UE category information to apply Dedicated Core Network, DCN, charging or roaming policy.

* * * * *